US012591917B2

(12) United States Patent
Dealba

(10) Patent No.: US 12,591,917 B2
(45) Date of Patent: *Mar. 31, 2026

(54) IDENTIFYING CONNECTION ACCESSORIES FOR ELECTRICAL CABLES

(71) Applicant: Elektrik App, Inc., Lindon, UT (US)

(72) Inventor: Mario Fernando Dealba, Lindon, UT (US)

(73) Assignee: Elektrik App, Inc., Lindon, UT (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/780,778

(22) Filed: Jul. 23, 2024

(65) Prior Publication Data

US 2025/0022032 A1     Jan. 16, 2025

Related U.S. Application Data

(63) Continuation of application No. 17/399,959, filed on Aug. 11, 2021, now Pat. No. 12,073,449.

(60) Provisional application No. 63/064,180, filed on Aug. 11, 2020.

(51) Int. Cl.
| | |
|---|---|
| *G06Q 30/00* | (2023.01) |
| *G06F 16/24* | (2019.01) |
| *G06Q 10/087* | (2023.01) |
| *G06Q 30/0601* | (2023.01) |

(52) U.S. Cl.
CPC ......... *G06Q 30/0627* (2013.01); *G06F 16/24* (2019.01); *G06Q 10/087* (2013.01)

(58) Field of Classification Search
CPC ................................................ G06Q 30/0627
See application file for complete search history.

(56) References Cited

U.S. PATENT DOCUMENTS

| | | |
|---|---|---|
| 2017/0169112 A1 | 6/2017 | Chiplonkar et al. |
| 2020/0067611 A1 | 2/2020 | Douglas et al. |
| 2022/0051306 A1 | 2/2022 | Dealba et al. |

FOREIGN PATENT DOCUMENTS

| | | |
|---|---|---|
| AU | 2018324490 | 4/2020 |
| JP | 2008269656 | 11/2008 |

OTHER PUBLICATIONS

Ahsan, Unaiza, et al. "Recommendations of Compatible Accessories in e-Commerce." 2020 IEEE International Conference on Big Data (Big Data). IEEE, 2020.*

* cited by examiner

*Primary Examiner* — Kathleen Palavecino
(74) *Attorney, Agent, or Firm* — Fish & Richardson P.C.

(57) ABSTRACT

This specification generally describes technology for identifying connection accessories for electrical cables. In some implementations, a system includes a product repository that includes electrical cable product data, the product data including, for each electrical cable represented in the product data, an electrical cable part number and various characteristic values for the electrical cable. An association data structure associates, for an electrical cable part number and a connection accessory type, connection accessories that are compatible for use with the electrical cable. A computing server is configured to handle requests for electrical cable and/or connection accessory information. User interfaces are provided to computing devices to facilitate information requests.

17 Claims, 29 Drawing Sheets

400

| Identify Cable |
| :---: |
| 402 |

↓

| Identify Range of Fit for Cable |
| :---: |
| 404 |

↓

| Identify Accessories Matching the Cable |
| :---: |
| 406 |

↓

| Access Fit Information for the Accessories |
| :---: |
| 408 |

↓

| Select Accessories<br>Having Suitable Range of Fit for Cable 410 |
| :---: |

↓

| Return Selected Accessories |
| :---: |
| 412 |

Determine and Transmit
Query Parameter Options
For First Filter Level        422

Receive Selected Option
For First Query Parameter        424

Determine and Transmit
Query Parameter Options
For Next Filter Level        426

Receive Selected Option
For Next Query Parameter        428

All Query
Parameters
Received?
430

No

Yes

Perform Search Using
Received Query Parameters
and Compound Index        432

| | | 6 | 4 | 2 | 1 | 1/0 | 2/0 |
|---|---|---|---|---|---|---|---|
| 1 | Cable/size | 6 | 4 | 2 | 1 | 1/0 | 2/0 |
| 2 | General Cable | 17001.120605 | 17001.120405 | 17001.120205 | 17001.120105 | 17001.125105 | 17001.125205 |
| 3 | Houston Wire | HW203 00601 | HW203 00401 | HW203 00201 | HW203 00101 | HW203010101 | HW203 20101 |
| 4 | Okonite | 114-23-3817 | 114-23-3819 | 114-23-3821 | 114-23-3823 | 114-23-3825 | 114-23-3827 |
| 5 | OmniCable | MVE20601 | MVE20401 | MVE20201 | MVE20101 | MVE21/001 | MVE22/001 |
| 6 | Priority | 4-015KVSEPMV10S | 4-015KVSEPMV10S | 2-015KVSEPMV10S | 1-015KVSEPMV10S | 1/0-015KVSEPMV10S | 2/0-015KVSEPMV10S |
| 7 | Prysmian | 20148378 | 20148375 | 20148374 | 20148373 | 20148375 | 20148378 |
| 8 | Southwire | 958013 | 958005 | 954638 | 954644 | 958005 | 958013 |
| 9 | | | | | | | |
| 10 | Splice/Size Wire | | | | | | |
| 11 | 3M | SSS1 | SSS1 | SSS1 | SSS1 | SSS1 | SSS1 |
| 12 | Raychem | HVS-8215 | HVS-8215 | HVS-8215 | HVS-8215 | HVS-8225 | HVS-8225 |
| 13 | DSG Canusa | CJ 821(W) | CJ 821(W) | CJ 821(W) | CJ 821(W) | CJ 821(W) | CJ 821(W) |
| 14 | DSG Canusa | | CSJ 820 | CSJ 820 | CSJ 820 | CSJ 820 | CSJ 821 |
| 15 | | | | | | | |
| 16 | Indoor Termination | | | | | | |
| 17 | 3M | 7620-T-95 | 7620-T-95 | 7691-T-95 | 7691-T-95 | 7691-T-95 | 7691-T-95 |
| 18 | 3M | 5622k | 5622k | 5622k | 5622k | 5622k | 5622k |
| 19 | Raychem | HVT-80-G | HVT-80-G | HVT-80-G | HVT-80-G | HVT-81-G | HVT-81-G |
| 20 | Raychem | | | TFT-150R-G | TFT-150R-G | TFT-150R-G | TFT-150R-G |
| 21 | Prysmian | | | | | | PICT15M1 |
| 22 | Elastimold | | | | | | |
| 23 | DSG Canusa | CT 081(G) | CT 081(G) | CT 081(G) | CT 081(G) | CT 082(G) | CT 082(G) |
| 24 | DSG Canusa | | | | | TITAN Z 0815 | TITAN Z 0815 |
| 25 | | | | | | | |
| 26 | Outdoor Termination | | | | | | |
| 27 | 3M | 7620-S-3 | 7620-S-2 | 7621-S-2 | 7621-S-2 | 7621-S-3 | 7621-S-2 |
| 28 | 3M | 5632k | 5632k | 5632k | 5632k | 5632k | 5632k |
| 29 | Raychem | HVT-80-SG | HVT-80-SG | HVT-80-SG | HVT-80-SG | HVT-81-SG | HVT-81-SG |
| 30 | Raychem | | | TFT-150R-G | TFT-150R-G | TFT-150R-G | TFT-150R-G |
| 31 | Prysmian | | | | | | PICT15M1 |
| 32 | Elastimold | | | | | | |
| 33 | DSG Canusa | CT 081E(G) | CT 081E(G) | CT 081E(G) | CT 081E(G) | CT 082E(G) | CT 082E(G) |
| 34 | DSG Canusa | | | | | TITAN Z 0815E | TITAN Z 0815E |

| Conduc | catalogNumber | excluded | insulationMaterial | compliances | name | manufacturer | type |
|---|---|---|---|---|---|---|---|
| 6 | 17001.12061 | | Ethylene Propylene | National Electric | Uniblend® | General Cable | Cable |
| 4 | 17001.12041 | | Ethylene Propylene | National Electric | Uniblend® | General Cable | Cable |
| 2 | 17001.12021 | | Ethylene Propylene | National Electric | Uniblend® | General Cable | Cable |
| 1 | 17001.12011 | | Ethylene Propylene | National Electric | Uniblend® | General Cable | Cable |
| 1/0 | 17001.12511 | | Ethylene Propylene | National Electric | Uniblend® | General Cable | Cable |
| 2/0 | 17001.12521 | | Ethylene Propylene | National Electric | Uniblend® | General Cable | Cable |
| 3/0 | 17001.12531 | | Ethylene Propylene | National Electric | Uniblend® | General Cable | Cable |
| 4/0 | 17001.13541 | | Ethylene Propylene | National Electric | Uniblend® | General Cable | Cable |
| 250 | 17001.13601 | | Ethylene Propylene | National Electric | Uniblend® | General Cable | Cable |
| 350 | 17001.13621 | | Ethylene Propylene | National Electric | Uniblend® | General Cable | Cable |
| 500 | 17001.13651 | | Ethylene Propylene | National Electric | Uniblend® | General Cable | Cable |
| 750 | 17001.13701 | | Ethylene Propylene | National Electric | Uniblend® | General Cable | Cable |
| 1000 | 17001.63751 | | Ethylene Propylene | National Electric | Uniblend® | General Cable | Cable |
| 6 | 17001.12061 | | Ethylene Propylene | National Electric | Uniblend® | General Cable | Cable |
| 4 | 17001.12041 | | Ethylene Propylene | National Electric | Uniblend® | General Cable | Cable |
| 2 | 17001.12021 | | Ethylene Propylene | National Electric | Uniblend® | General Cable | Cable |
| 1 | 17001.12021 | | Ethylene Propylene | National Electric | Uniblend® | General Cable | Cable |
| 1/0 | 17001.12011 | | Ethylene Propylene | National Electric | Uniblend® | General Cable | Cable |
| 2/0 | 17001.12521 | | Ethylene Propylene | National Electric | Uniblend® | General Cable | Cable |
| 3/0 | 17001.12531 | | Ethylene Propylene | National Electric | Uniblend® | General Cable | Cable |
| 4/0 | 17001.13541 | | Ethylene Propylene | National Electric | Uniblend® | General Cable | Cable |
| 250 | 17001.13601 | | Ethylene Propylene | National Electric | Uniblend® | General Cable | Cable |
| 350 | 17001.13621 | | Ethylene Propylene | National Electric | Uniblend® | General Cable | Cable |

| dataSheetUrl | videoUrl | cableTy | voltage | jacket | numb | insulationL | armor | conductorMa | conductorComp |
|---|---|---|---|---|---|---|---|---|---|
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Copper | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |
| https:// | uploads-ssl.webflow.com/5 | Tape Sh | 5000 | PVC | 1 | 133% | | Aluminum | Compact |

Figure 5C:
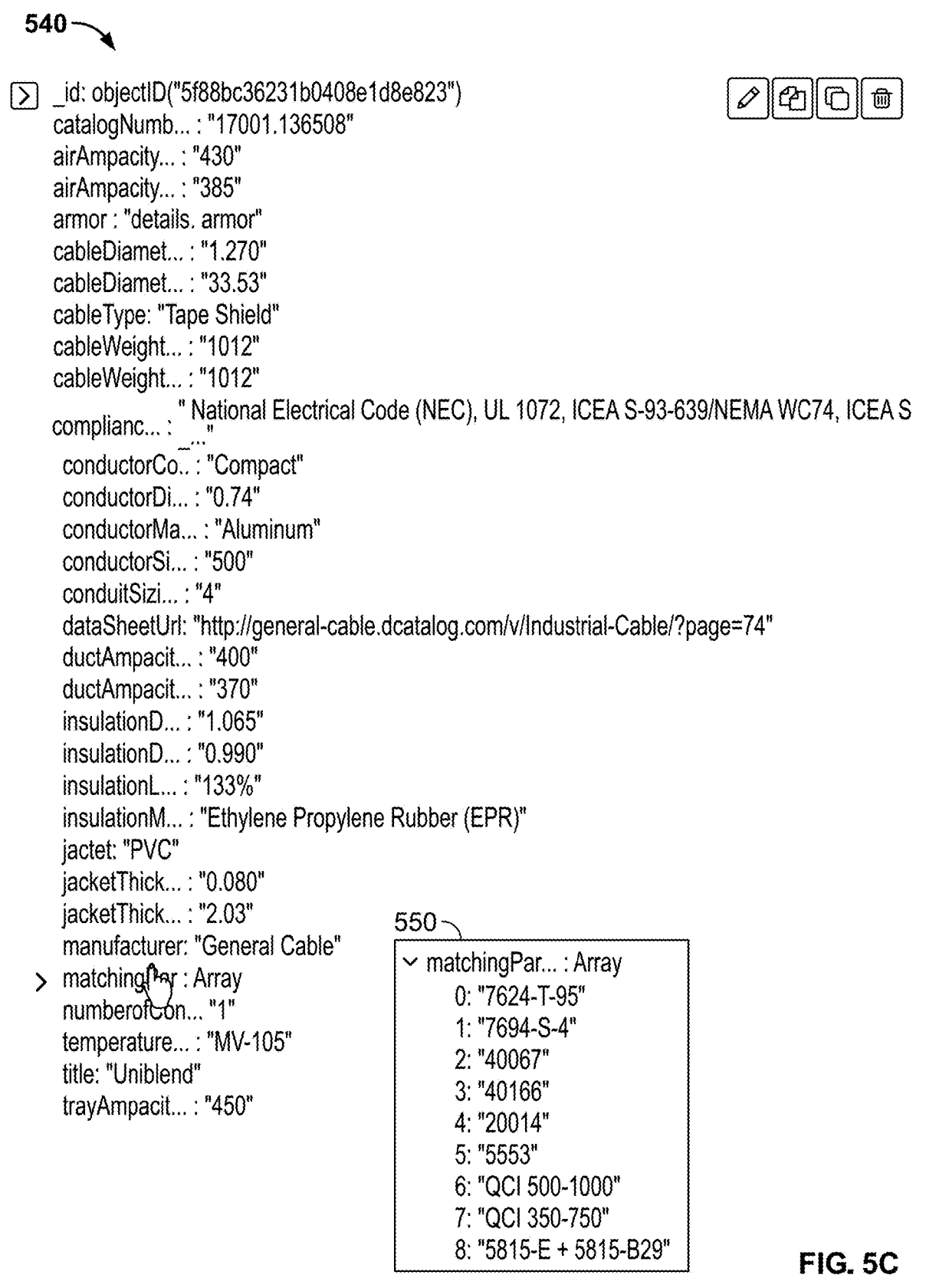

[pencil icon] [copy icon] [copy icon] [trash icon]

[>] _id: objectID("5f88bc36231b0408e1d8e823")
catalogNumb... : "17001.136508"
airAmpacity... : "430"
airAmpacity... : "385"
armor : "details. armor"
cableDiamet... : "1.270"
cableDiamet... : "33.53"
cableType: "Tape Shield"
cableWeight... : "1012"
cableWeight... : "1012"
complianc... : " National Electrical Code (NEC), UL 1072, ICEA S-93-639/NEMA WC74, ICEA S ... "
conductorCo.. : "Compact"
conductorDi... : "0.74"
conductorMa... : "Aluminum"
conductorSi... : "500"
conduitSizi... : "4"
dataSheetUrl: "http://general-cable.dcatalog.com/v/Industrial-Cable/?page=74"
ductAmpacit... : "400"
ductAmpacit... : "370"
insulationD... : "1.065"
insulationD... : "0.990"
insulationL... : "133%"
insulationM... : "Ethylene Propylene Rubber (EPR)"
jactet: "PVC"
jacketThick... : "0.080"
jacketThick... : "2.03"
manufacturer: "General Cable"
> matchingPar : Array
numberofCon... "1"
temperature... : "MV-105"
title: "Uniblend"
trayAmpacit... : "450"

550
∨ matchingPar... : Array
0: "7624-T-95"
1: "7694-S-4"
2: "40067"
3: "40166"
4: "20014"
5: "5553"
6: "QCI 500-1000"
7: "QCI 350-750"
8: "5815-E + 5815-B29"

Projects    New

Select a Project

Project1

Select a Project List

List1

Add Part

IDENTIFYING CONNECTION ACCESSORIES FOR ELECTRICAL CABLES

CROSS-REFERENCE TO RELATED APPLICATIONS

This application is a continuation of U.S. application Ser. No. 17/399,959, filed on Aug. 11, 2021, which claims the benefit of priority to U.S. Application No. 63/064,180, filed on Aug. 11, 2020. The contents of the aforementioned applications are incorporated by reference in their entirety.

TECHNICAL FIELD

This document generally describes technology for identifying connection accessories for electrical cables.

BACKGROUND

Electrical cables may be used to connect electrical equipment, enabling the transfer of electrical power. Many different electrical cable manufacturers exist, each manufacturer generally producing electrical cables of various voltages, insulations, shielding types, conductive metal types, numbers of conductors, and sizes. Electrical connectors may be used to join electrical terminations of the electrical cables. Many different manufacturers of connection accessories exist, each manufacturer generally producing connection accessories of various types, the connection accessories being compatible for use with various different electrical cables.

SUMMARY

This document generally describes computer-based technology for identifying connection accessories for electrical cables. For example, identifying electrical cables and compatible accessories, such as splice/joints, indoor terminations, outdoor terminations, loadbreak elbows, deadbreak elbows, lugs, crimps, and/or other accessories, can be challenging and time consuming, even for experts in the field. For instance, identifying electrical cables and compatible accessories can involve evaluating a number of different component characteristics, such as a voltage value, an insulation value, a shielding value, a conducting metal value, a number of conductors value, and a size value. And identifying compatible components across different manufacturers can pose additional challenges around inconsistent product lines and offerings across manufacturers. The disclosed technology facilitates identifying compatible components to ensure matching cables and accessories can be located, including across multiple different manufacturers of cables and accessories.

In some implementations, a system includes a product repository that includes electrical cable product data, the product data including, for each electrical cable represented in the product data, an electrical cable part number and various characteristic values for the electrical cable. Such characteristic values may include a voltage value, an insulation value, a number of conductors value, a cable type value, a conductor metal value, and a conductor size value. An association data structure associates, for an electrical cable part number and a connection accessory type, connection accessories that are compatible for use with the electrical cable. A computing server is configured to handle requests for electrical cable and/or connection accessory information, including receiving requests for information from computing devices, accessing the product repository and the association data structure to identify the requested information, and providing the requested information to the computing devices. User interfaces are provided to computing devices to facilitate information requests, including user interfaces that facilitate identifying connection accessories for electrical cables (e.g., connection accessories having a suitable range of fit for an electrical cable), user interfaces that facilitate identifying similar electrical cables, and user interfaces that facilitate identifying similar connection accessories.

The systems, devices, program products, and processes described throughout this document can, in some instances, provide one or more of the following advantages. A software application can reference a complex yet compact data structure, and a decision-driven logic tree, to quickly and accurately identify optimal connection accessories for an electrical cable. The software application can facilitate the identification of cables that may be similar to a given cable. The software application can facilitate the identification of connection accessories that may be similar to a given connection accessory. Specification and price information relevant to an electrical cable and/or connection accessory can be quickly retrieved and compared through the software application. Unstructured information can be quickly accessed using a compound index while executing a progressive search for an electrical cable, to ensure that query parameter options are valid, and that the search will return at least one search result.

The details of one or more embodiments are set forth in the accompanying drawings and the description below. Other features and advantages will be apparent from the description and drawings, and from the claims.

BRIEF DESCRIPTION OF DRAWINGS

FIGS. 5A-C show example data structures that facilitate identifying connection accessories for electrical cables.

Like reference symbols in the various drawings indicate like elements.

DETAILED DESCRIPTION

This document generally describes systems, devices, and techniques for identifying connection accessories for electrical cables. For example, a software application can be provided that enables a user to quickly identify a cable part number for a cable and to determine optimal connection accessories for the cable. The software application, for example, can reference a complex yet compact data structure (e.g., a collection of data sets), and a decision-driven logic tree, to automatically determine the optimal connection accessories. In some implementations, determining the optimal connection accessories may include determining a correct fit for a given cable. Determining the correct fit, for example, can include measuring a minimum and maximum diameter of cable insulation for each cable, and determining a corresponding minimum and maximum diameter for connection accessories across an entire data set. The software application can include user interfaces that facilitate identification of connection accessories for electrical cables, identification of similar electrical cables, and identification of similar connection accessories, in a fast and accurate manner.

Figure 1:
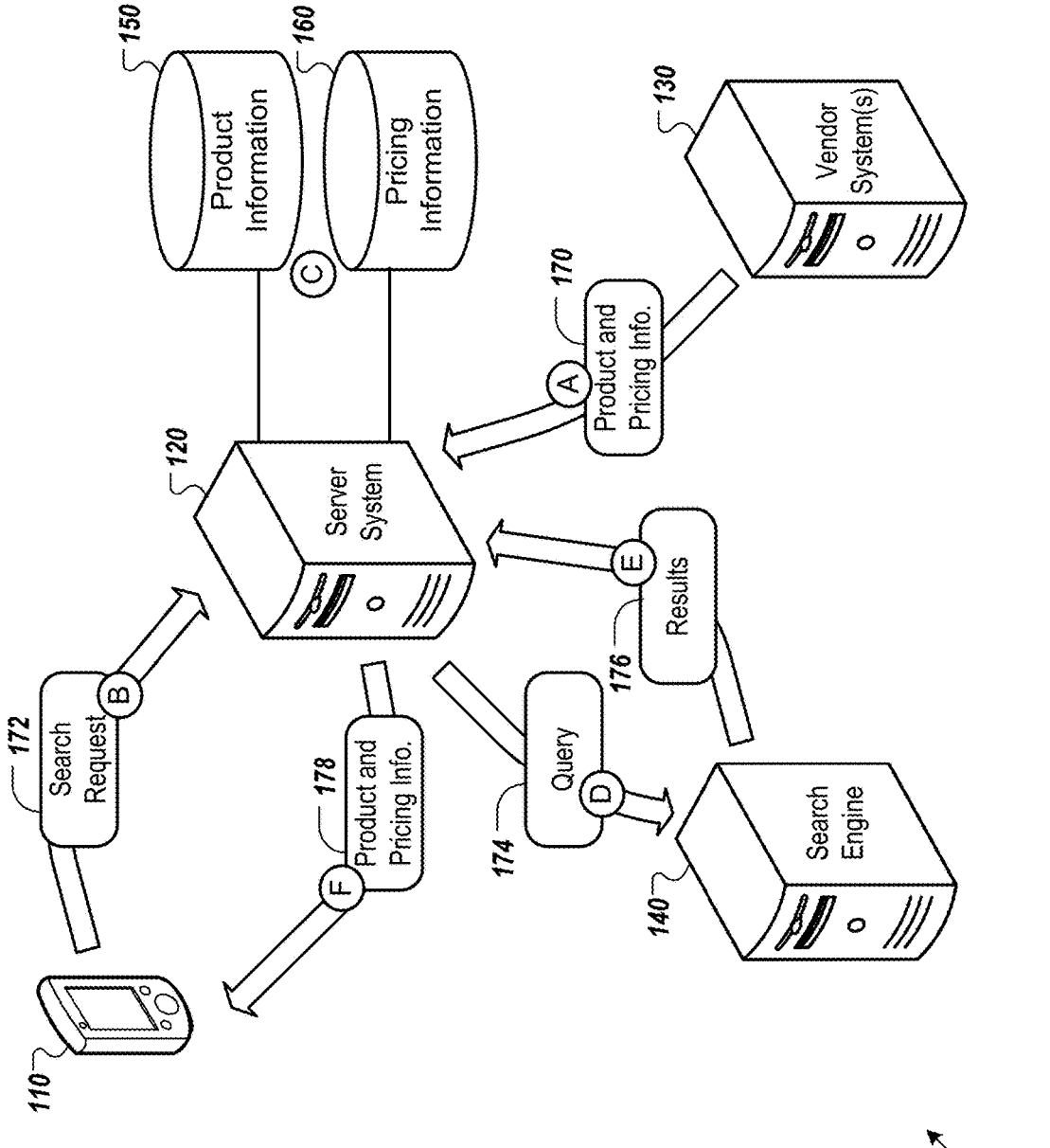
FIG. 1 is a conceptual diagram of an example system for identifying connection accessories for electrical cables.

FIG. 1 is a conceptual diagram of an example system 100 for identifying connection accessories for electrical cables. In the depicted example, the system 100 includes a computing device 110, a server system 120, one or more vendor systems 130, and a search engine system 140. The computing device 110, for example, can be a mobile computing device (e.g., smartphone, tablet, laptop, personal digital assistant, etc.), a stationary computing device (e.g., personal computer, kiosk, etc.), or another suitable computing device. Each of the systems 120, 130, 140, for example, can include various forms of computing servers, including, but not limited to network servers, web servers, application servers, or other suitable computing servers. The computing device 110 and the systems 120, 130, 140, for example, can communicate with each other over one or more communication networks (not shown), including a LAN (local area network), a WAN (wide area network), and/or the Internet. In some examples, one or more of the systems 120, 130, 140, can be split into multiple other systems. In some examples, two or more of the systems 120, 130, 140, can be combined into a single system.

FIG. 1 also illustrates an example process flow for identifying connection accessories for electrical cables, shown in stages (A) to (F). Stages (A) to (F) may occur in the illustrated sequence, or they may occur in a sequence that is different than in the illustrated sequence, and/or two or more stages (A) to (F) may be concurrent.

During stage (A), for example, the server system 120 receives product and pricing information 170 for electrical cables and/or connection accessories from one or more vendor systems 130. After receiving the product and pricing information 170, the server system 120 can process and organize the information, and can store the information in association with product identifiers, for example, in a product information data store 150 and a pricing information data store 160. The data stores 150, 160, for example, can include databases, file systems, computer memory, and/or other suitable data stores. In some examples, some or all of the product and pricing information 170 may be provided to the computing device 110 for storage such that at least a portion of a request for product information can be processed locally by the computing device 110. In some examples, the product and pricing information 170 may be maintained by the server system 120 such that a request for product information can be processed when the computing device 110 is in communication with the server system 120.

During stage (B), for example, the server system 120 can receive a cable search request 172 from a software application running on the computing device 110. For example, the cable search request 172 can include one or more parameter values that correspond to various characteristics of an electrical cable (e.g., voltage, insulation, shielding, metal, number of conductors, size, and/or other suitable characteristics). In response to receiving the cable search request 172, for example, during stage (C), the server system 120 can identify product and/or pricing information responsive to the cable search request 172. For example, the server system 120 can reference one or more data structures in the product information data store 150 to identify one or more electrical cables that have characteristics that match the one or more parameter values, and/or to identify one or more connection accessories that are compatible with an electrical cable having the characteristics. Optionally, the server system 120 can reference the pricing information data store 160 to identify pricing information for at least one of the one or more identified electrical cable(s) and/or at least one of the one or more identified connection accessories.

During stages (D) and (E), for example, the server system 120 can optionally provide a query 174 to the search engine 140, and can receive results 176 in response to the query 174. For example, the query 174 can include a part identifier of an electrical cable and/or a connection accessory, and the search engine 140 can search for product information and/or pricing information relevant to the part identifier. The product information, for example, can include product specifications, product data sheets, product ratings, product reviews, and/or other suitable product information. The pricing information, for example, can include current prices for the electrical cable and/or connection accessory according to one or more product vendors.

During stage (F), for example, the server system 120 can provide product and pricing information 178 to the computing device 110. For example, the product and pricing information 178 can include product and pricing information identified by the server system 120 (e.g., during stage (C)), and/or can be based on the results 176 received from the search engine 140 (e.g., during stage (E)). The product and pricing information 178, for example, can be rendered for display to a user of the computing device 110 by the software application running on the device.

Figure 2:
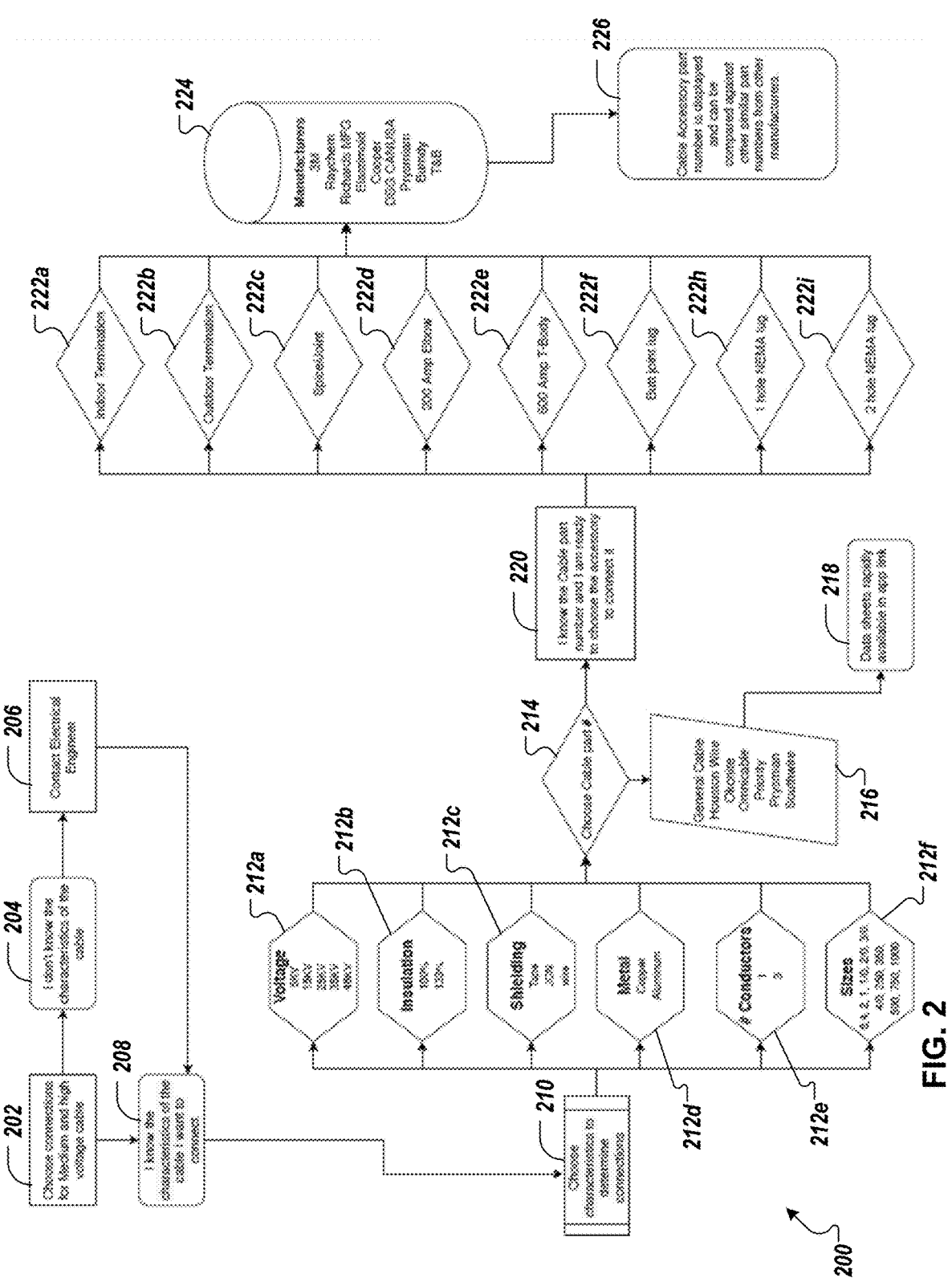
FIG. 2 shows an example process for identifying connection accessories for electrical cables.

Referring now to FIG. 2, an example process 200 for identifying connection accessories for electrical cables is shown. The process 200 can be performed by components of the system 100, for example. However, other systems may be used to perform the same or similar process.

At (202), the process 200 for identifying connection accessories for electrical cables (e.g., medium and high voltage cables) can begin. If characteristics of an electrical cable are unknown (204), for example, one may contact an electrical engineer (206) for assistance in determining such characteristics. When the characteristics of the electrical cable are known (208), for example, a user of the computing device 110 (shown in FIG. 1) can interact with a software application on the device to identify suitable connection accessories for the electrical cable.

Referring now to FIGS. 6A-E, example user interfaces that facilitate identifying connection accessories for electrical cables are shown. For example, when the user launches the software application on the computing device 110, the device can present a splash interface 600 (shown in FIG. 6A) that identifies the software application. After presenting the splash interface 600, for example, the device can present a disclaimer interface 605 (also shown in FIG. 6A) that informs the user that the software application is to be used as a guide, that the user should contact a product manufacturer if the user has any questions regarding a product, and that the creators of the application are not to be held responsible for any problems that may occur through use of the application. After the user accepts the terms presented by the disclaimer interface 605, for example, the computing device 110 can present a menu interface 610 (also shown in FIG. 6A) that presents the user with various options, including an option for identifying connection accessories for a given electrical cable (e.g., "Elektrik Smart Tool"), an option for identifying cables that are similar to a given electrical cable (e.g., "Enter Cable Number"), and an option for identifying connection accessories that are similar to a given connection accessory (e.g., "Enter Accessory Number"). In the present example, the user can select the "Elektrik Smart Tool" option to identify connection accessories for the given electrical cable, and in response, the software application can present a cable search interface 615 (shown in FIG. 6B) through which the user can provide parameter values that specify various characteristics of an electrical cable that the user would like to identify.

Referring again to FIG. 2, for example, at (210), the user can specify characteristics of an electrical cable to identify possible connection accessories. In the present example, the characteristics can include voltage (212a), insulation (212b), shielding (212c), metal (212d), number of conductors (212e), and size (212f), although other examples may include additional or fewer characteristics. Using the cable search interface 615, for example, the user can provide parameter values for one or more of the characteristics, and then interact with a search initiation control (e.g., click a search button) after the parameter values have been provided to initiate a search for an electrical cable having the characteristics.

Figure 6A:
FIGS. 6A-E show example user interfaces that facilitate identifying connection accessories for electrical cables.
Figure 6B:
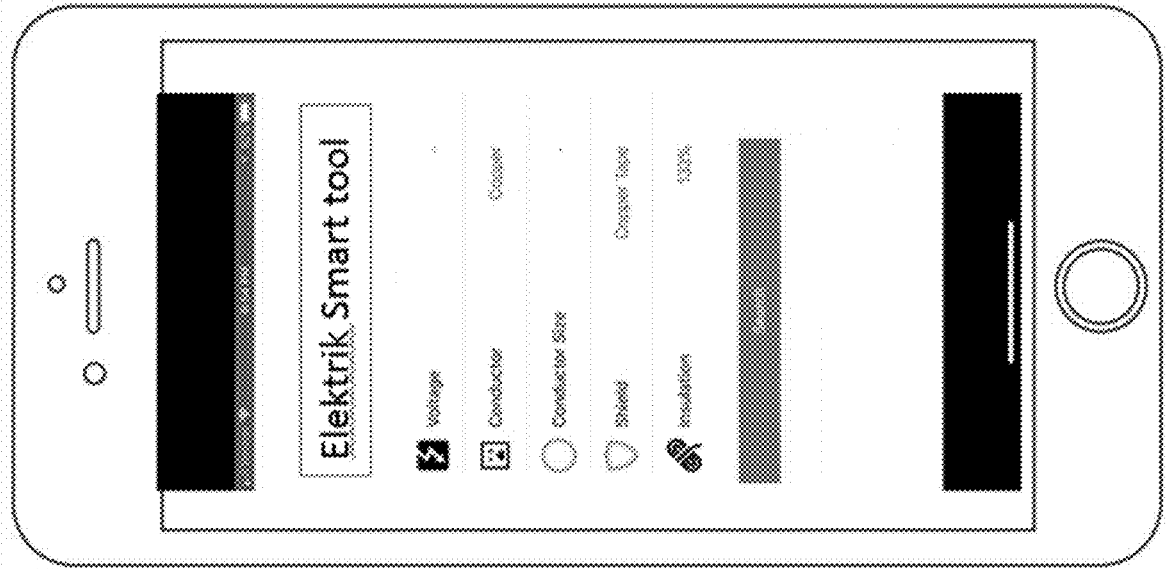
Figure 6B:
Figure 6C:
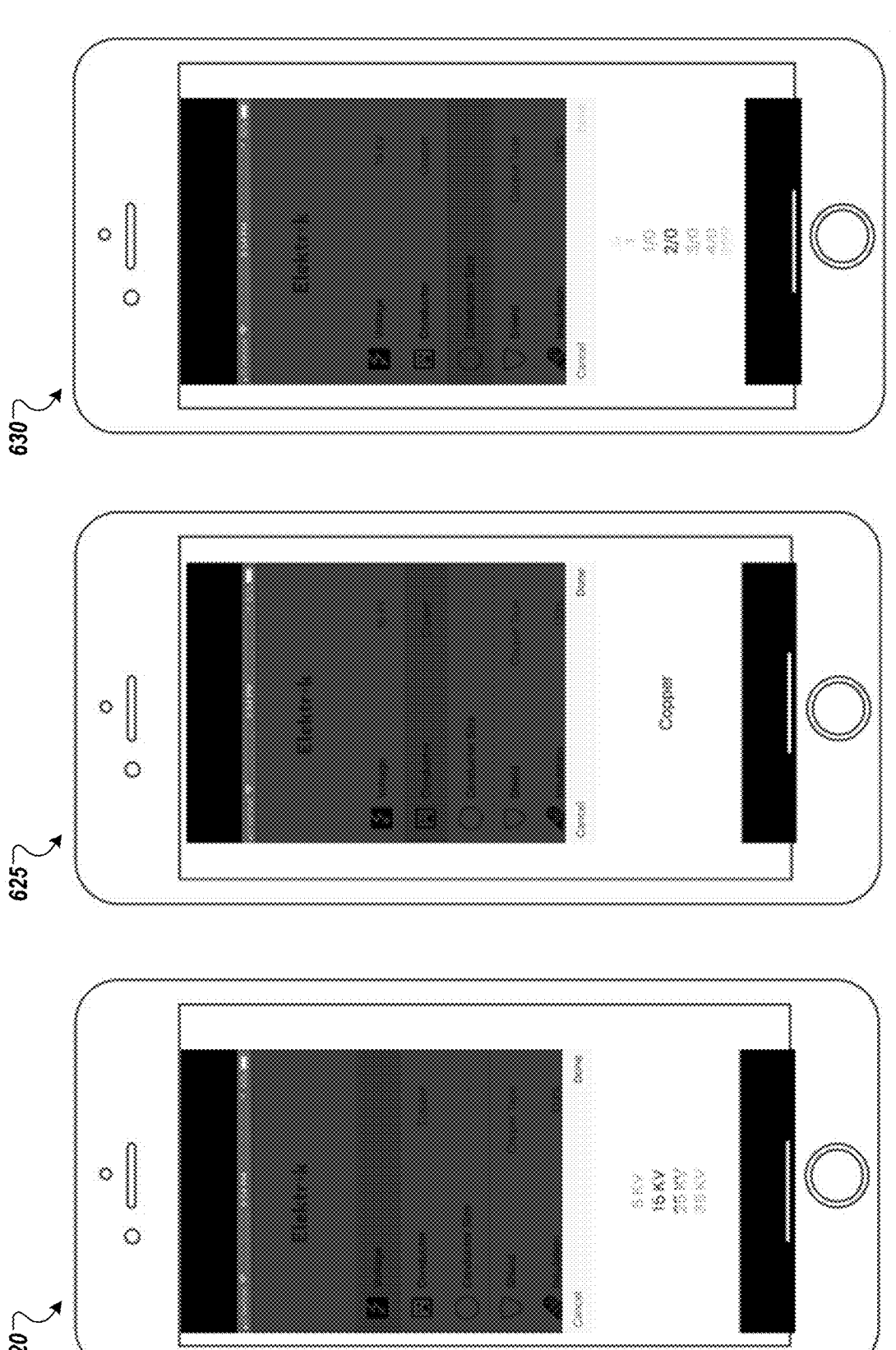
Figure 6D:
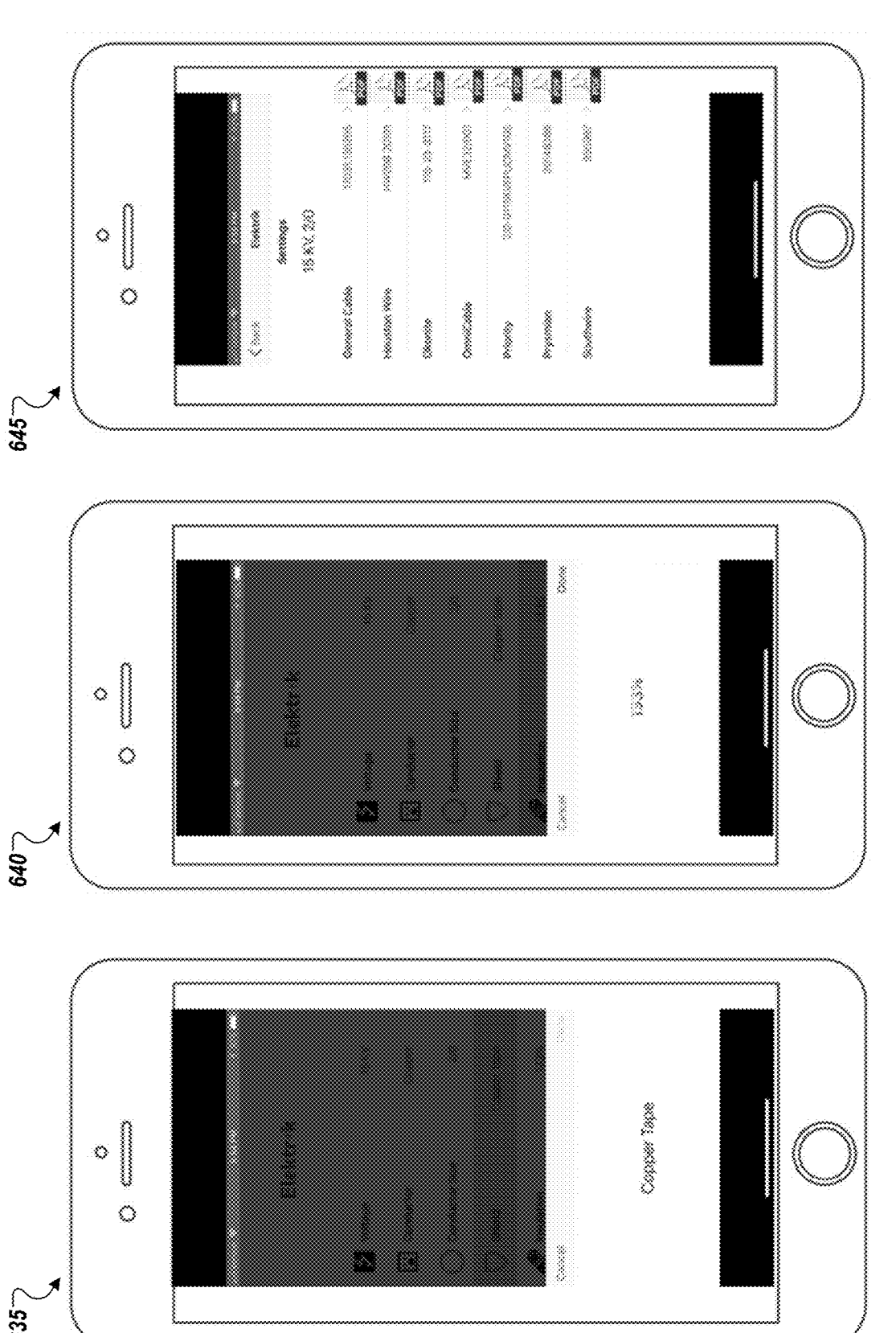

Referring now to FIGS. 6C-D, for example, various interfaces are shown for providing parameter values that specify various characteristics of an electrical cable. When the user interacts with a voltage control on the cable search interface 615 (shown in FIG. 6B), for example, the software application can present a voltage selection interface 620 (shown in FIG. 6C), the user can select a voltage of an electrical cable (e.g., 15 KV), and the user can return to the interface 615. When the user interacts with a metal (e.g., conductor metal) selection control on the cable search interface 615, for example, the software application can present a metal selection interface 625 (shown in FIG. 6C), the user can select a conducting metal of an electrical cable (e.g., copper), and the user can return to the interface 615. When the user interacts with a size (e.g., conductor size) selection control on the cable search interface 615, for example, the software application can present a size selection interface 630 (shown in FIG. 6C), the user can select a conductor size of an electrical cable (e.g., 2/0), and the user can return to the interface 615. When the user interacts with a shielding selection control on the cable search interface 615, for example, the software application can present a shielding selection interface 635 (shown in FIG. 6D), the user can select a shielding type of an electrical cable (e.g., copper type), and the user can return to the interface 615. When the user interacts with a insulation selection control on the cable search interface 615, for example, the software application can present an insulation selection interface 640 (shown in FIG. 6D), the user can select an insulation of an electrical cable (e.g., 133%), and the user can return to the interface 615.

After the user has interacted with one or more of the interfaces 620, 625, 630, 635, 640, for example, the user can click the search button on the cable search interface 615, and information related to one or more electrical cables matching the provided parameter values can be identified and presented through the software application. Referring again to FIG. 1, for example, the software application running on the computing device 110 can provide the cable search request 172 (e.g., including the search parameters provided through one or more of the interfaces 620, 625, 630, 635, 645), in response to the search button on the cable search interface 615 having been clicked. In response to receiving the cable search request 172, for example, the server system 210 can access the product information data store 150 to identify matching electrical cables.

In general, data structures for identifying electrical cables and/or for identifying connection accessories for electrical cables can include a multi-dimensional mapping of characteristic values to part identifiers. Referring now to FIG. 5A, an example data structure 500 that facilitates identifying connection accessories for electrical cables is shown. The example data structure 500, for example, represents a portion of the data included in the information data store 150, however other data formats, structures, relationships, and/or mapping schemes may be used in other examples. In the present example, the data structure 500 can be used to identify electrical cables and connection accessories for electrical cables having characteristic values of 5 KV (voltage), 133% (insulation), tape (shielding type), copper (conducting metal), and single (number of conductors). Columns B-G in the present example each refer to different size characteristic values (e.g., 6, 4, 2, 1, 1/0, 2/0, etc.). Column A in the present example refers to various manufacturers of electrical cables and/or connection accessories. For example, if a given cable were to have the above characteristic values and were to be a size 6, possible cables may include General Cable 17001.120605, Houston Wire HW203 00601, Okonite 114-23-3817, and OmniCable MVE20601, whereas if the given cable were to be a size 4, possible cables may include General Cable 17001.120405, Houston Wire HW203 00401, Okonite 114-23-3819, OmniCable MVE20401, and Priority 4-015KVSEPMV105.

Figure 5D:
FIG. 5D shows an example process for generating data structures that facilitate identifying connection accessories for electrical cables.
Figure 5D:
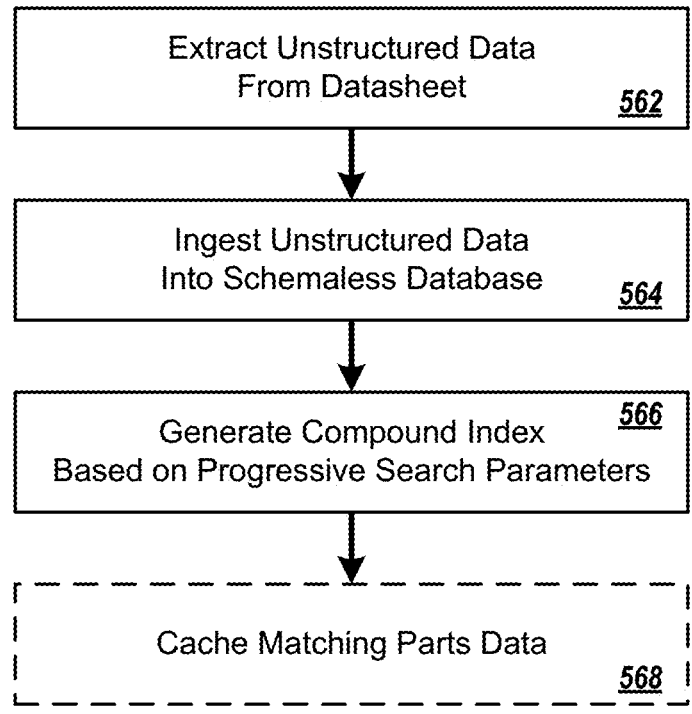

In some implementations, data structures for identifying electrical cables and/or for identifying connection accessories for electrical cables can be generated based on unstructured data. Referring now to FIG. 5D, an example process 560 for generating data structures that facilitate identifying connection accessories for electrical cables is shown. The process 560 can be performed by components of the system 100, for example. However, other systems may be used to perform the same or similar process. In some implementations, the process 560 may be performed by the server system 120 (shown in FIG. 1), and the generated data structures can be stored by the information data store 150, for use in servicing subsequent progressive searches for electrical part information.

Unstructured data can be extracted from a datasheet (562). Referring now to FIG. 5B, example unstructured data 520 that includes attribute values for electrical cables is shown. The example unstructured data 520, for example, can be a flat data structure (e.g., a datasheet) in which each part (e.g., electrical cable) is represented as a row, and various attributes of the parts are represented as columns. In general, electrical cables can differ in that different cables may not share a common set of attributes. As a result, the data structure 520 may include sparse data, in which a relatively high percentage of data values for some attributes may be empty. However, some attributes (e.g., voltage, insulation, number of conductors, cable type, conductor material, conductor size, etc.) may be common across all cables, such that data values for the common attributes may include data values for all of the cables. In some implementations, extracting unstructured data from a datasheet can include using a script to parse the data maintained in the datasheet, and to provide the extracted data to a schemaless database.

Unstructured data can be ingested into a schemaless database (564). For example, the unstructured data 520 can be provided to a NoSQL database system that is configured to store data that is modeled using a flexible format. Referring now to FIG. 5C, example ingested unstructured data 540 is shown. In the present example, the ingested unstructured data 540 includes data values for various fields associated with a particular electrical cable.

After ingesting unstructured data, for example, a compound index can be generated (566) based on parameters for a progressive search to be performed for identifying an electrical cable. In general, a compound index can be an index structure that includes references to multiple fields within ingested unstructured data, and that sorts the data according to the multiple fields. In the present example, a compound index for facilitating a progressive search of electrical cable data includes, in order, a first field (e.g., voltage), a second field (e.g., insulation), a third field (e.g., number of conductors), a fourth field (e.g., cable type), a fifth field (e.g., conductor material), and a sixth field (e.g., conductor size). Other examples may include different fields, a different number of fields, and/or fields that are provided in a different order. Each field of the compound index, for example, can represent a common attribute for the electrical cables, such that the fields include data values for all of the cables. In general, a compound index can be configured to support fast searching of ingested unstructured data when search parameters are received that correspond to all of the index fields, or a beginning ordered subset of the index fields. For example, the schemaless database can use the compound index for facilitating a progressive search of electrical cable data in response to receiving a search parameter for the first field, or in response to receiving search parameters for the first and second fields, or in response to receiving search parameters for the first, second, and third fields, and so forth.

In some implementations, matching parts data can be cached (568). Referring again to FIG. 5C, for example, a cache 550 of matching parts data can be maintained for the ingested unstructured data 540. By caching identifiers of connection accessories that are compatible with an electrical cable, for example, relevant information can be quickly provided in response to searches, without the computational overhead of performing another query. In the present example, the cache 550 of matching parts data can be stored as an array of part numbers for connection accessories that have been determined as matching an electrical cable represented by the ingested unstructured data 540. The cache 550, for example, can be generated and added to the unstructured data before or after the data is ingested into the schemaless database. An example process for determining connection accessories for an electrical cable is described with reference to FIG. 4A. As another example, suitable connection accessories for an electrical cable may be determined by an expert.

Referring again to FIG. 1, for example, after one or more electrical cables matching the provided parameter values have been identified by the server system 120, information regarding the matching electrical cables can be provided to the computing device 110 as product and pricing information 178. Referring again to FIG. 6D, for example, the software application running on the computing device 110 can present a matching cable interface 645. The interface 645 in the present example presents a list of electrical cables, including a manufacturer, a part number, and an information link, for each of the cables having characteristic values matching the parameter values specified by the user. Through the interface 645, for example, the user can identify a part number of an electrical cable when the manufacturer and the characteristic values are known.

Referring again to FIG. 2, for example, the user can select an electrical cable part number (214), from a list (216) of possible part numbers of cables having characteristic values matching the parameter values specified by the user. At (218), for example, additional information related to the electrical cables can be provided to the user. For example, the user can use the matching cable interface 645 (shown in FIG. 6D) to select (e.g., click on) an information icon provided for an electrical cable part number, and to receive the additional information (e.g., a PDF file including the information). At (220), for example, after having selected the electrical cable part number, a process for selecting a suitable connection accessory for the selected electrical cable can begin. In the present example, possible connection types for the selected electrical cable can include indoor termination (222a), outdoor termination (222b), splice/joint (222c), 200 amp elbow (222d), 600 amp t-body (222c), butt joint lug (222f), one hole NEMA lug (222h), and 2 hole NEMA lug (222i), although other examples and/or other electrical cables may include additional or fewer connection types.

Figure 6E:
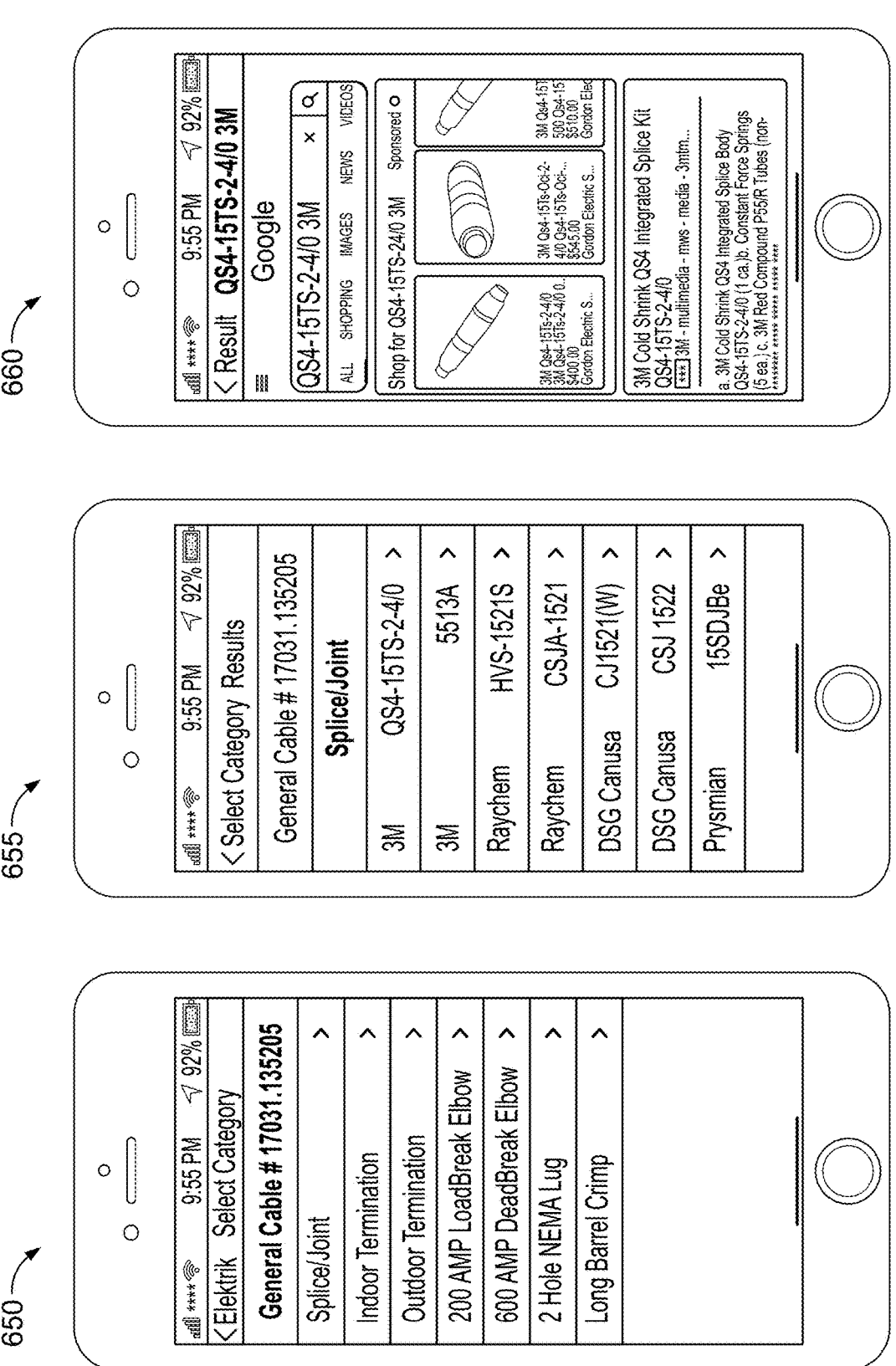

At (224), for example, suitable connection accessories available from various manufacturers, for a selected type of connection accessory, and for the selected electrical cable can be identified and provided (224). Referring now to FIG. 6E, for example, the software application can present a connection type selection interface 650 for selecting a type of connection accessory to use with the selected electrical cable. In the present example, the user can select (e.g., click) a type of connection accessory (e.g., splice/joint), and in response, the software application can send another search request 172 (e.g., a connection accessory search request) to the server system 120, and the server system 120 can access the product information data store 150 to identify one or more suitable connection accessories of the selected type for the selected electrical cable. Referring again to FIG. 5A, for example, for an electrical cable having characteristic values of 5 KV (voltage), 133% (insulation), tape (shielding type), copper (conducting metal), single (number of conductors), and six (size), possible splice connection accessories include 3M 5551, Raychem HVS-821S, DSG Canusa CJ 821 (W), whereas possible indoor termination accessories include 3M 7620-T-95, 3M 5621k, and DSG Canusa CT 081 (G). Referring again to FIG. 1, for example, the identified suitable connection accessories of the selected type for the selected electrical cable can be provided in the product and pricing information 178 for presentation by the software application running on the computing device 110. For example, the software application can present a matching connection accessory interface 655 (shown in FIG. 6E) that includes a list of suitable connection accessories of the selected type for the selected cable.

In some examples, identifying suitable connection accessories for an electrical cable may include determining a range of fit for the cable. In general, not all connection accessories that are listed as possibly being compatible with electrical cables of a given size may actually fit all cables of that size. For example, some manufacturers may compress a conducting metal more than others, such that a range of fit may be smaller than that of other manufacturers. As such, a diameter range including minimum and maximum diameters can be determined for an electrical cable to ensure a proper fit with a connection accessory.

Figure 3:
FIG. 3 shows an example electrical cable.
Figure 3:
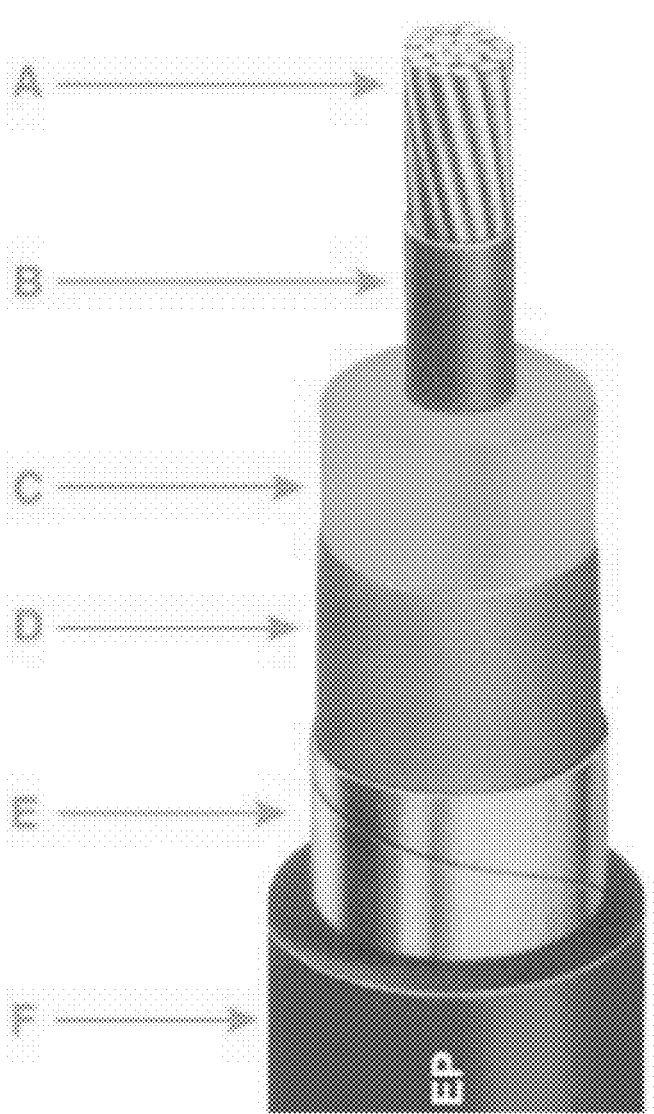

Referring now to FIG. 3, an example electrical cable 300 is shown. In general, electrical cables are assemblies including conductors with insulations, screens, assembly protection, and protective coverings. The electrical cable 300, for example, includes various components, each respective outer component forming a layer that is formed over the inner components. Component (A), for example, can be an uncoated, compact stranded, metal (e.g., copper) conductor. Component (B), for example, can be a strand screen, including an extruded semiconducting insulation material. Component (C), for example, can be an insulation material. Component (D), for example, can be an insulation screen, including an extruded semiconducting insulation material. Component (E), for example, can be a shielding material (e.g., copper tape or another suitable material). Component (F), for example, can be a jacket material (e.g., including polyvinyl chloride or another suitable material).

Figure 4A:
FIG. 4A shows an example process for selecting connection accessories having a suitable range of fit for an electrical cable.
Figure 4A:
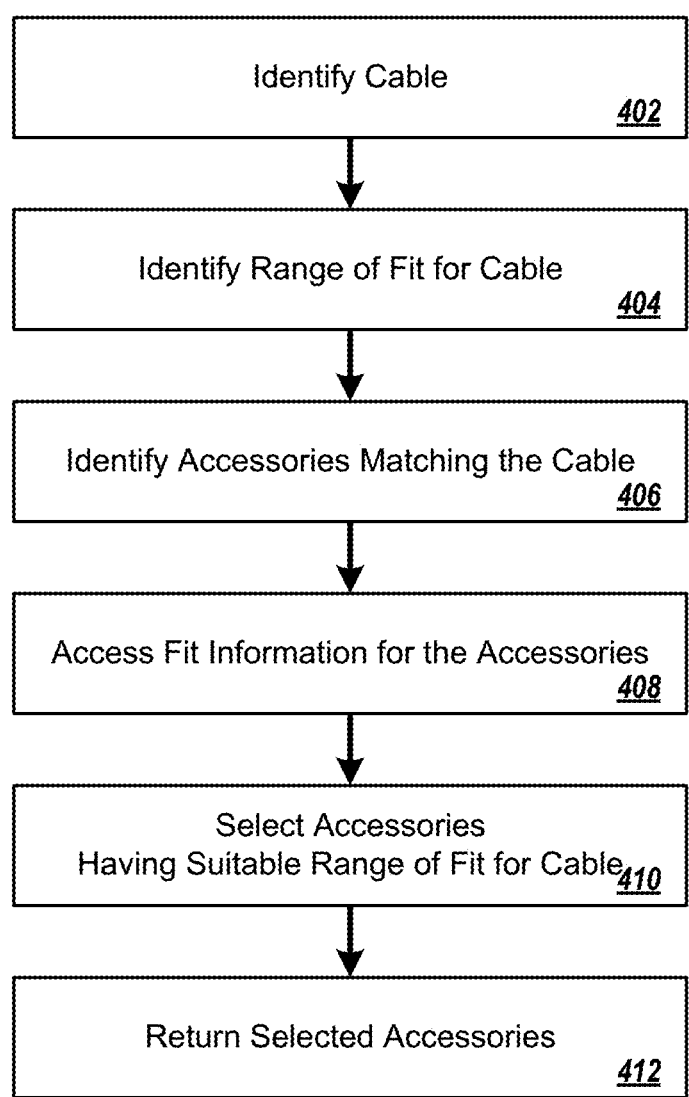

Referring now to FIG. 4A, an example process 400 for selecting connection accessories having a suitable range of fit for an electrical cable is shown. The process 400 can be performed by components of the system 100, for example. However, other systems may be used to perform the same or similar process. In some implementations, the process 400 may be performed by the server system 120 (shown in FIG. 1) as part of processing and organizing received product and pricing information 170 (also shown in FIG. 1) to improve predetermined associations between electrical cable parts and connection accessory parts. In some implementations, some or all of the process 400 may be performed in response to requests for information from computing devices (e.g., computing device 110).

A cable can be identified (402). For example, the server system 120 (shown in FIG. 1) can identify product information 150 (also shown in FIG. 1) for electrical cable 300 (shown in FIG. 3). A range of fit for the cable can be identified (404). In general, a range of fit for an electrical cable may include a minimum diameter for the cable and a maximum diameter for the cable. The minimum diameter, for example, can correspond with an insulation diameter of the cable (e.g., Component (C) of the electrical cable 300). The maximum diameter, for example, can correspond with an insulation screen diameter of the cable (e.g., Component (D) of the electrical cable 300).

Accessories matching the cable can be identified (406). For example, the server system 120 can access the product information 150 for connection accessories that are specified as possibly fitting the electrical cable 300 (e.g., based on size). Fit information for the identified accessories can be accessed (408). In general, a range of fit for a connection accessory may include a minimum diameter for the accessory and a maximum diameter for the accessory. For example, each of the identified matching connection accessories can include a corresponding range of fit. Accessories having a suitable range of fit for the cable can be selected (410). In some examples, if an electrical cable's range of fit were to be entirely within a connection accessory's range of fit, the connection accessory may be selected. In some example, if a connection accessory's range of fit were to be entirely within an electrical cable's range of fit, the connection accessory may be selected. In some examples, if a connection accessory's range of fit and an electrical cable's range of fit were to at least partially overlap, the connection accessory may be selected. Selected accessories can be returned (412). For example, the server system 120 can provide the selected connection accessories for the selected electrical cable in the product and pricing information 178 for presentation by the software application running on the computing device 110.

Referring again to FIG. 2, for example, connection accessory information of connection accessories from different manufacturers can be presented such that the information is readily comparable (226). Referring again to FIG. 6E, for example, the matching connection accessory interface 655 can include manufacturers and part numbers for connection accessories of the selected type for the selected electrical cable. In some implementations, price information for each of the connection accessories may be collected and aggregated across various vendors that sell the connection accessories. For example, the server system 120 (shown in FIG. 1) can perform a search of vendor websites, and price information (e.g., a range of prices, a minimum price, or other suitable price information) can be provided for each connection accessory on the interface 655. In some implementations, a link to a product search may be provided for each of the connection accessories. For example, the user can interact with (e.g., select) one of the connection accessories listed on the interface 655, and in response, the computing device 110 (shown in FIG. 1) can send another search request 172 (e.g., including a part number of the selected connection accessory) to the server system 120, which can in turn submit query 174 to search engine 140, and receive search results 176 to server system 120, which can provide some or all of the search results to the computing device 110 as additional product and pricing information 178. As another example, the computing device 110 can provide the query 174 to the search engine 140, and can receive the corresponding results 176 directly from the search engine. After receiving the additional product and pricing information 178, for example, the computing device 110 can present the information to the user through a product information interface 660 (e.g., a search page through which the user can identify pricing and/or vendor information for the selected accessory). In some implementations, analytics regarding connection accessory part selection may be performed. For example, the server system 120 can maintain aggregated information about which connection accessories are selected and/or searched on by users with respect to various electrical cables having been selected through the software application.

In addition to, or instead of using the system 100 to facilitate identifying connection accessories for electrical cables, the system 100 can be used to facilitate identifying a cable that may be similar to a given electrical cable, and/or to facilitate identifying a connection accessory that may be similar to a given connection accessory. For example, if a part number is known by a user, the software application running on the computing device 110 can be used to identify suitable alternate parts. In the present example, the user can launch a software tool to facilitate identifying similar electrical cables by selecting an "Enter Cable Number" option from the menu interface 610 (shown in FIG. 6A), and/or can launch a software tool to facilitate identifying similar connection accessories by selecting an "Enter Accessory Number" option from the menu interface 610.

Figure 6F:
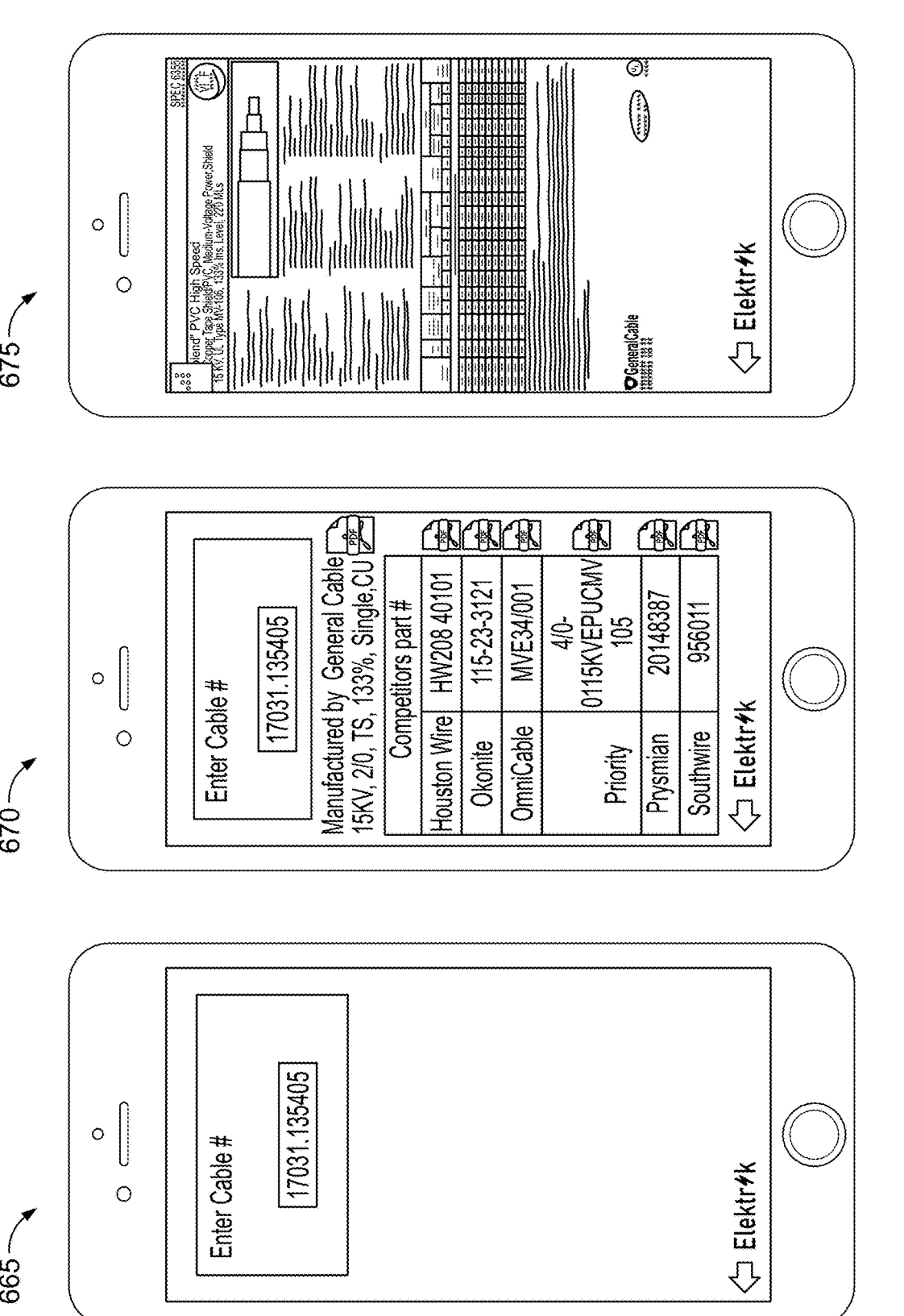
FIG. 6F shows example user interfaces that facilitate identifying similar electrical cables.

Referring now to FIG. 6F, example user interfaces that facilitate identifying similar electrical cables are shown. For example, the user can enter a part number of an electrical cable using a cable part number interface 655. The computing device 110 (shown in FIG. 1) can provide the part number of the electrical cable in the search request 172, for example, and the server system 120 (also shown in FIG. 1) can access the product information 150 (also shown in FIG. 1) to identify part numbers of one or more other electrical cables that are similar to the electrical cable. The part numbers of the similar electrical cables can be provided by the server system 120 to the computing device 110, for example, as product and pricing information 178. The software application running on the computing device 110 can present the received information through a similar cable interface 670 that lists manufacturers, part numbers, and information links for similar electrical cables. If a user selects an information link, for example, the computing device 110 can present information (e.g., a PDF file including the information, a search result page, a vendor page, etc.) regarding the similar electrical cable to the user through an information presentation interface 675.

Figure 6G:
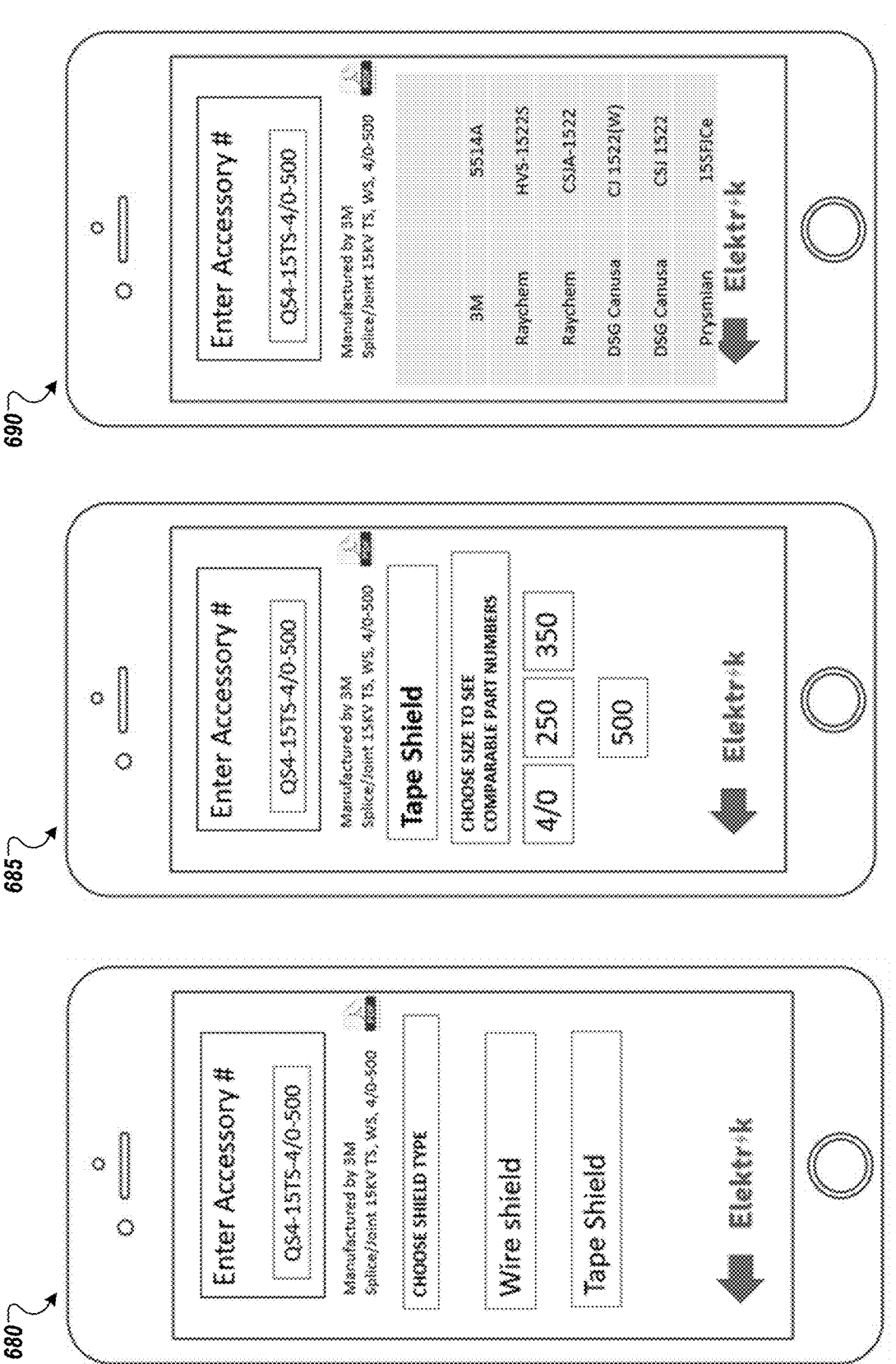
FIG. 6G shows example user interfaces that facilitate identifying similar connection accessories.

Referring now to FIG. 6G, example user interfaces that facilitate identifying similar connection accessories are shown. For example, the user can enter a part number of a connection accessory using an accessory part number interface 680, and can select a shield type of the connection accessory (e.g., wire shield, tape shield, or another sort of shield type). Afterwards, the software application can present a connection accessory size selection interface through which the user can specify a size of the connection accessory. The computing device 110 (shown in FIG. 1) can provide the part number of the connection accessory, the shield type, the size, and/or other suitable search parameters for the connection accessory in the search request 172, for example. In response, the server system 120 (also shown in FIG. 1) can access the product information 150 (also shown in FIG. 1) to identify part numbers of one or more other connection accessories that are similar to the connection accessory. The part numbers of the similar connection accessories can be provided by the server system 120 to the computing device 110, for example, as product and pricing information 178. The software application running on the computing device 110 can present the received information through a similar connection accessory interface 690 that lists manufacturers, part numbers, and information links for similar connection accessories. If a user selects an information link, for example, the computing device 110 can present information (e.g., a PDF file including the information) regarding the similar electrical cable to the user through an information presentation interface (similar to information presentation interface 675, shown in FIG. 6F).

Referring now to FIGS. 7A-I, example user interfaces that facilitate performing a progressive search for identifying an electrical cable and matching connection accessories are shown. The user interfaces for performing the progressive search can be provided in addition to or as an alternative to the cable search interface 615 (shown in FIG. 6B). For example, when the user launches the software application on the computing device 110, the device can present an interface 700 (shown in FIG. 7A) for initiating a progressive search for an electrical cable.

Figure 4B:
FIG. 4B shows an example process for performing a progressive search for identifying an electrical cable and matching connection accessories.
Figure 4B:
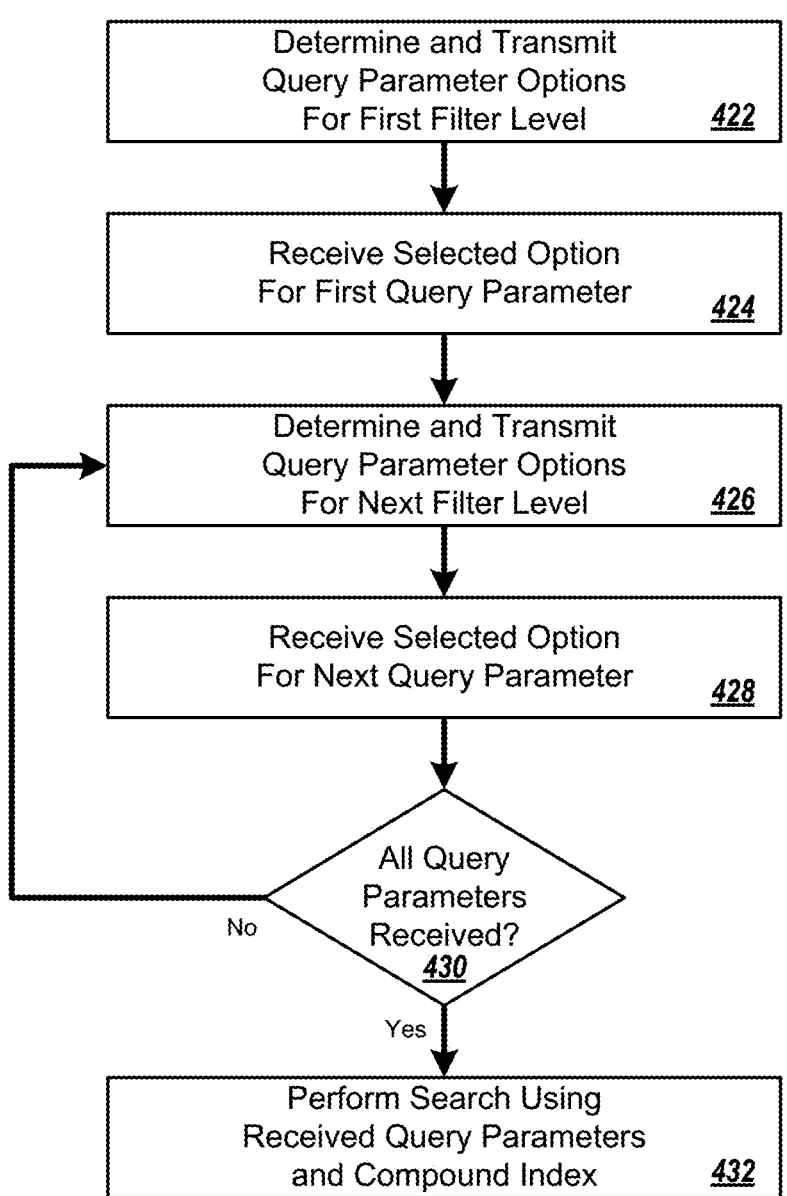

Referring now to FIG. 4B, an example process 420 for performing a progressive search for identifying an electrical cable and matching connection accessories is shown. The process 420 can be performed by components of the system 100, for example. However, other systems may be used to perform the same or similar process. In some implementations, the process 420 may be performed by the server system 120, and some or all of the process 420 may be performed in response to requests for information from computing devices (e.g., computing device 110). In general, progressive searches can include determining and transmitting query parameter options for a series of successive filter levels. In response to receiving a selected option for a given query parameter, a server (e.g., the server system 120) can perform a search of parts data (e.g., using a compound index for a schemaless database) and can quickly identify query parameter options for a next filter level. Each consecutive filter level, for example, can correspond to a consecutive field in the compound index. The progressive search can be performed according to a fixed sequence that ensures that relevant selection criteria is being considered by a user, and that ensures that a pool of data is being effectively filtered with each consecutive query parameter selection. When the progressive search has been completed (e.g., when query parameters have been received for each field in the compound index), a list of one or more parts (e.g., electrical cables) can be determined that match all of the query parameters. By performing the progressive search, for example, the server system 120 can ensure that each option for selecting a query parameter is a valid option, and that a final search will return at least one search result.

Query parameter options for a first filter level can be determined and transmitted (422). For example, the server system 120 can receive a request from the computing device 110 to initiate a progressive search for a part (e.g., an electrical cable). In response to the request, for example, the server system 120 can access a schemaless database of part information (e.g., maintained by the information data store 150), and can execute a first search for stored values of a first field of a compound index used for performing the progressive search. In the present example, the first field of the compound index is a voltage field, and the first search returns the stored values for the voltage field across all of the electrical cable records in the schemaless database (e.g., 600 V, 1000 V, 2000 V, 5 kV, 8 kV, 15 kV, 25 kV, 35 kV, 46 kV, and 69 kV). After executing the first search, for example, the server system 120 transmits the results of the first search (e.g., the voltage field values) to the computing device 110 for presentation as query parameter options for the first filter level (e.g., a voltage search filter).

A selected option can be received (424) for a first query parameter. Referring again to FIG. 7A, for example, the computing device 110 can populate a selection control 702 of the interface 700 with the voltage field values, and can receive user input that indicates a selection of one of the voltage field values. A voltage value, for example, can impact compatibility with various accessory components. In the present example, a user selects 15 kV, and the computing device 110 transmits the selected option for the first query parameter for receipt by the server system 120.

Query parameter options for a next filter level can be determined and transmitted (426). In response to receiving the selected option for the first query parameter, for example, the server system 120 can execute a query that filters the part information in the schemaless database according to the first filter level (e.g., by searching for the electrical cable records that have a value in the first field that matches the selected option of 15 kV for the first query parameter), and that returns stored values of a next field (e.g., a second field) of the compound index used for performing the progressive search. In the present example, the next field (e.g., the second field) of the compound index is an insulation level field, and the next search (e.g., the second search) returns the stored values for the insulation level across all of the electrical cable records in the schemaless database that has been filtered according to the first filter level. After executing the second search, for example, the server system 120 transmits the results of the second search (e.g., insulation level field values of 100% and 133%) to the computing device 110 for presentation as query parameter options for the second filter level (e.g., an insulation level search filter).

Figure 7A:
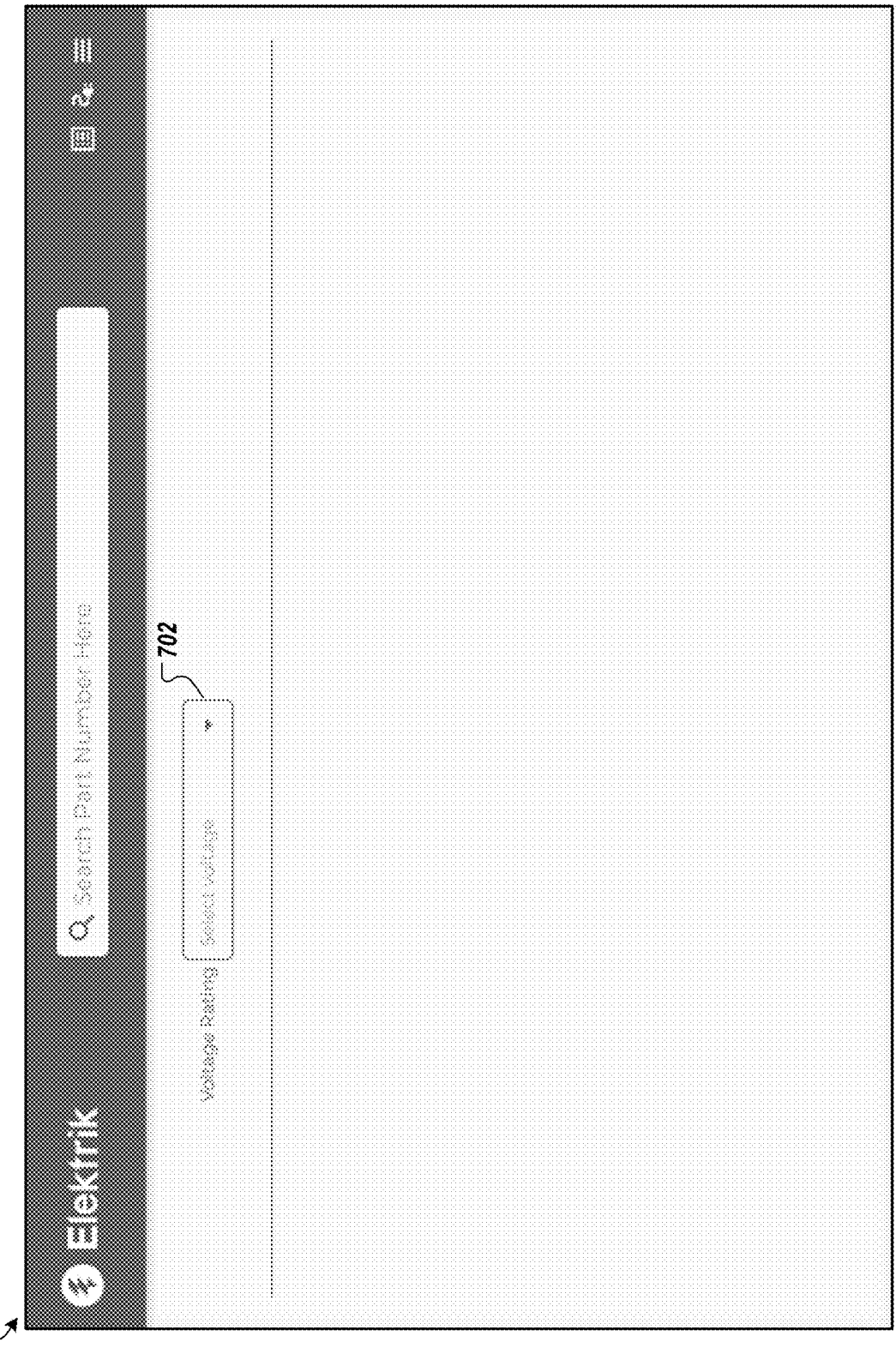
FIGS. 7A-I show example user interfaces that facilitate performing a progressive search for identifying an electrical cable and matching connection accessories.
Figure 7B:
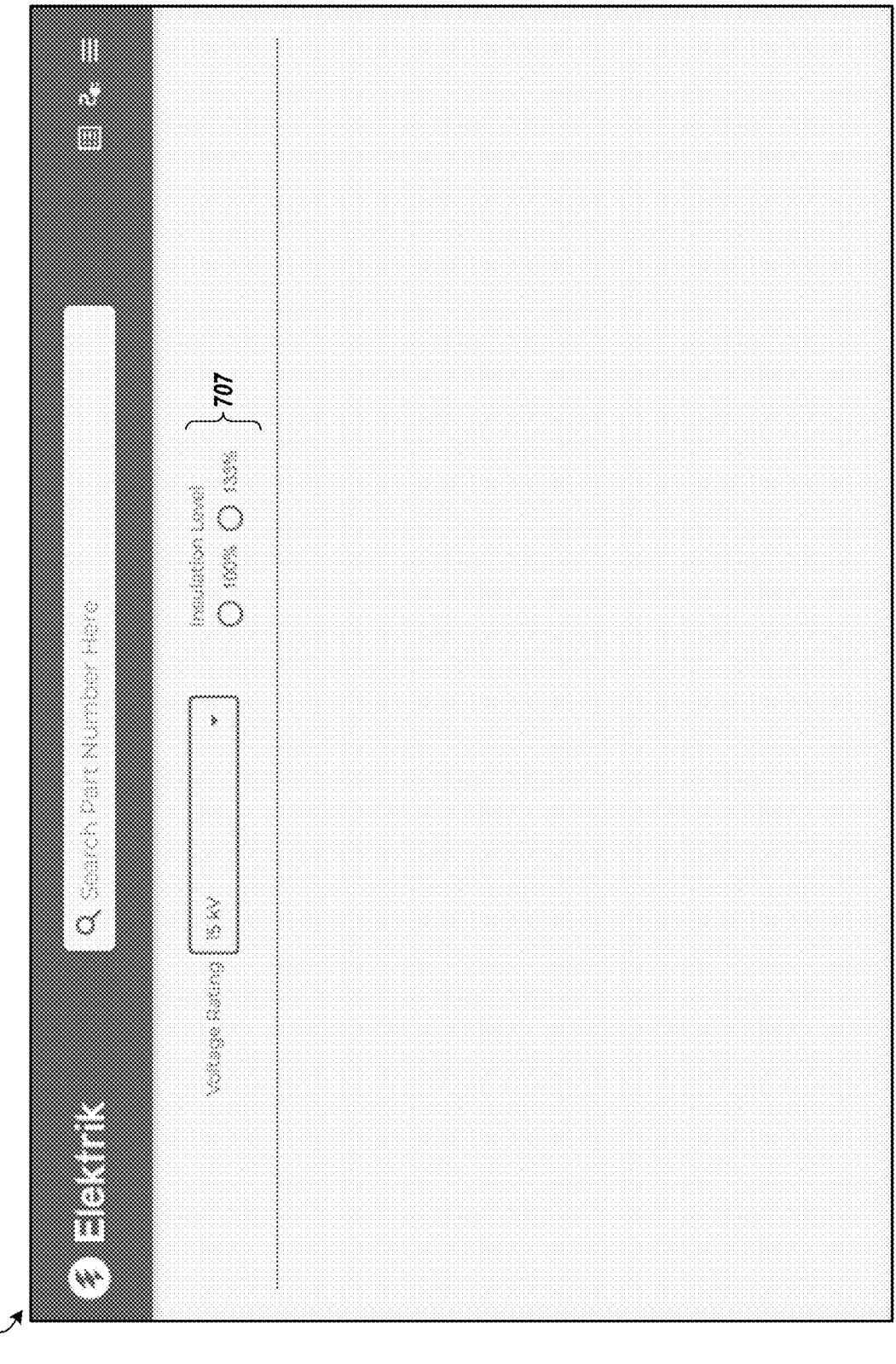

A selected option can be received (428) for a next query parameter (e.g., a second query parameter). Referring to FIG. 7B, for example, the computing device 110 can populate a selection control 707 of interface 705 with the retrieved insulation level field values, and can receive user input that indicates a selection of one of the insulation level field values. An insulation value, for example, can impact cable thickness and can influence fit with various accessory components. In the present example, a user selects 100% as the insulation level, and the computing device 110 transmits the selected option for the next query parameter (e.g., the second query parameter) for receipt by the server system 120.

A determination can be performed of whether all query parameters have been received for a progressive search (430). For example, the server system 120 can store and access parameter values previously received from computing device 110 during a session in which a progressive query is being generated. As another example, each time a selected option for a query parameter is transmitted by the computing device 110, the previously selected options for all of the previous query parameters can also be transmitted, such that the server system 120 receives query parameters that correspond to a beginning ordered subset of the index fields (or all of the index fields) corresponding to the compound index for the schemaless database. In the present example, not all of the query parameters (e.g., a first query parameter corresponding to the voltage field, a second query parameter corresponding to the insulation field, a third query parameter corresponding to the number of conductors field, a fourth query parameter corresponding to the cable type field, a fifth query parameter corresponding to the conductor material field, and a sixth query parameter corresponding to the conductor size field) have been received, so the process iterates through (426) and (428) until all of the query parameters have been received.

In the present example, parameter options for a next filter level can again be determined and transmitted (426). In response to receiving the selected option for the second query parameter (e.g., insulation level), the server system 120 can execute a query that filters the part information in the schemaless database according to the second filter level (e.g., by searching for the electrical cable records that have first and second field values that matches the previously selected first and second query parameters), and that returns stored values of a next field (e.g., a third field) of the compound index used for performing the progressive search. In the present example, the next field (e.g., the third field) of the compound index is a number of conductors field, and the next search (e.g., the third search) returns the stored values for the number of conductors across all of the electrical cable records in the schemaless database that has been filtered according to the second filter level. After executing the third search, for example, the server system 120 transmits the results of the third search (e.g., the number of conductors field values of 1/C and 3/C) to the computing device 110 for presentation as query parameter options for the third filter level (e.g., a number of conductors search filter).

Figure 7C:
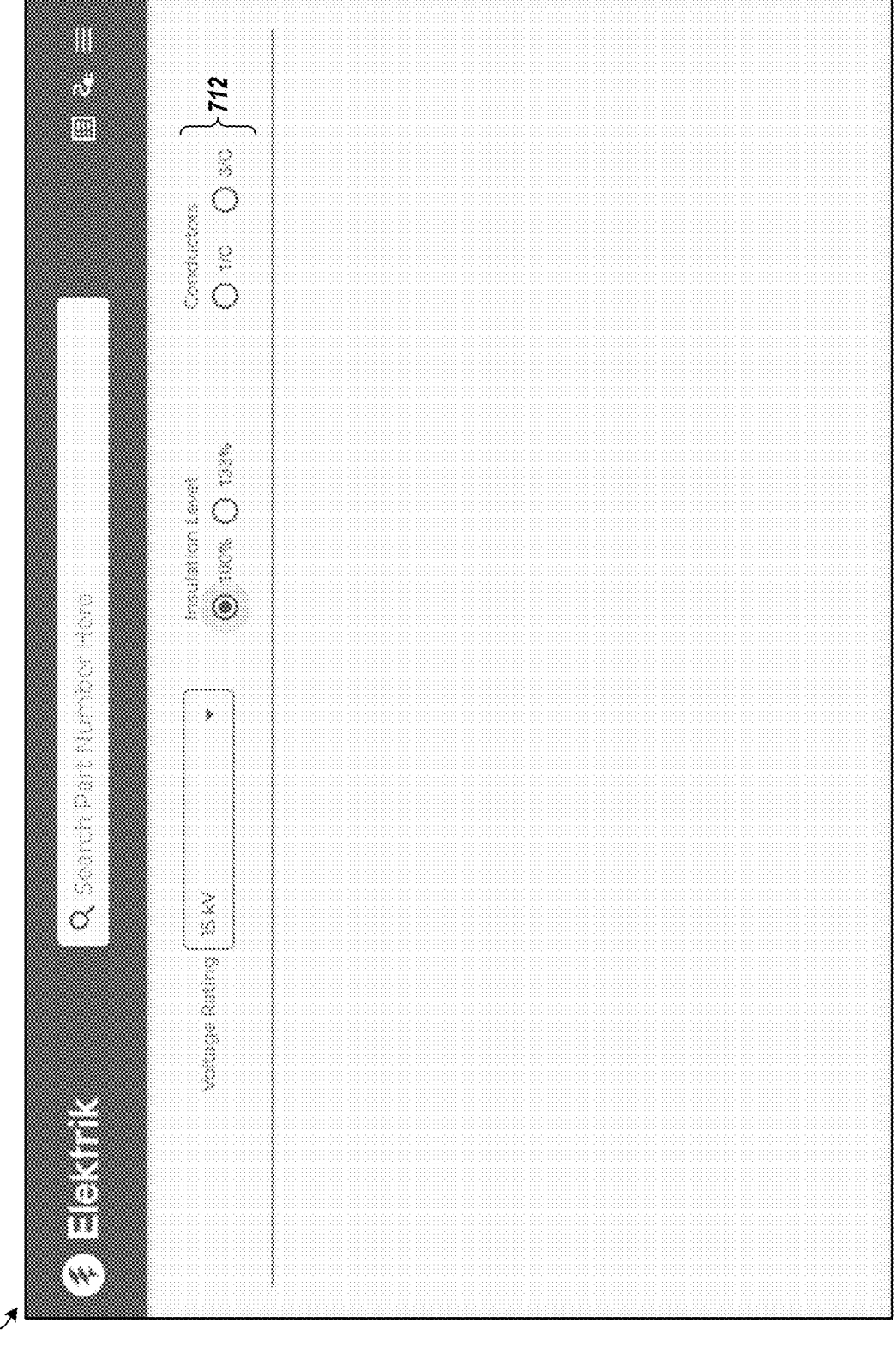
Figure 7D:
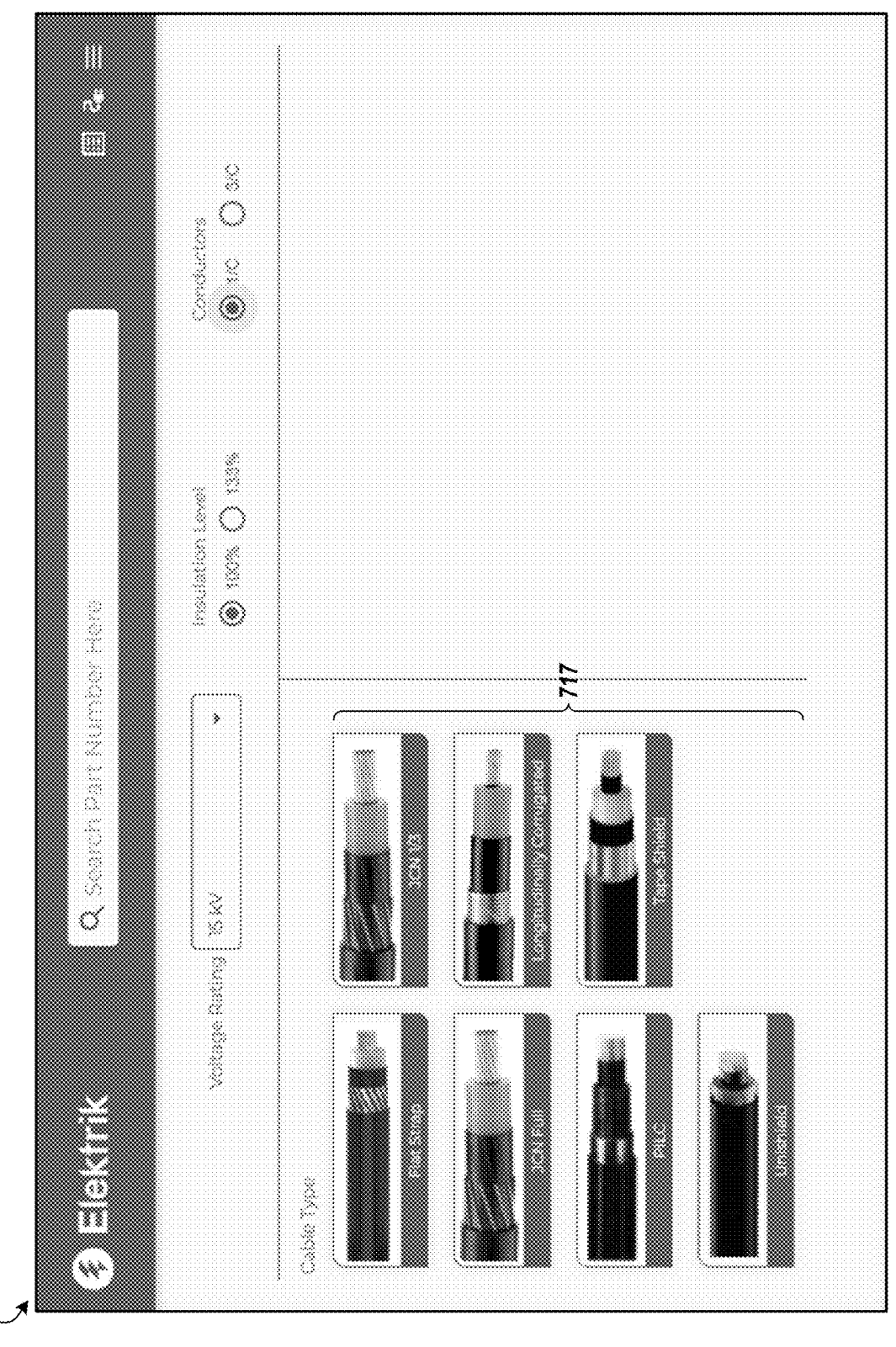
Figure 7E:
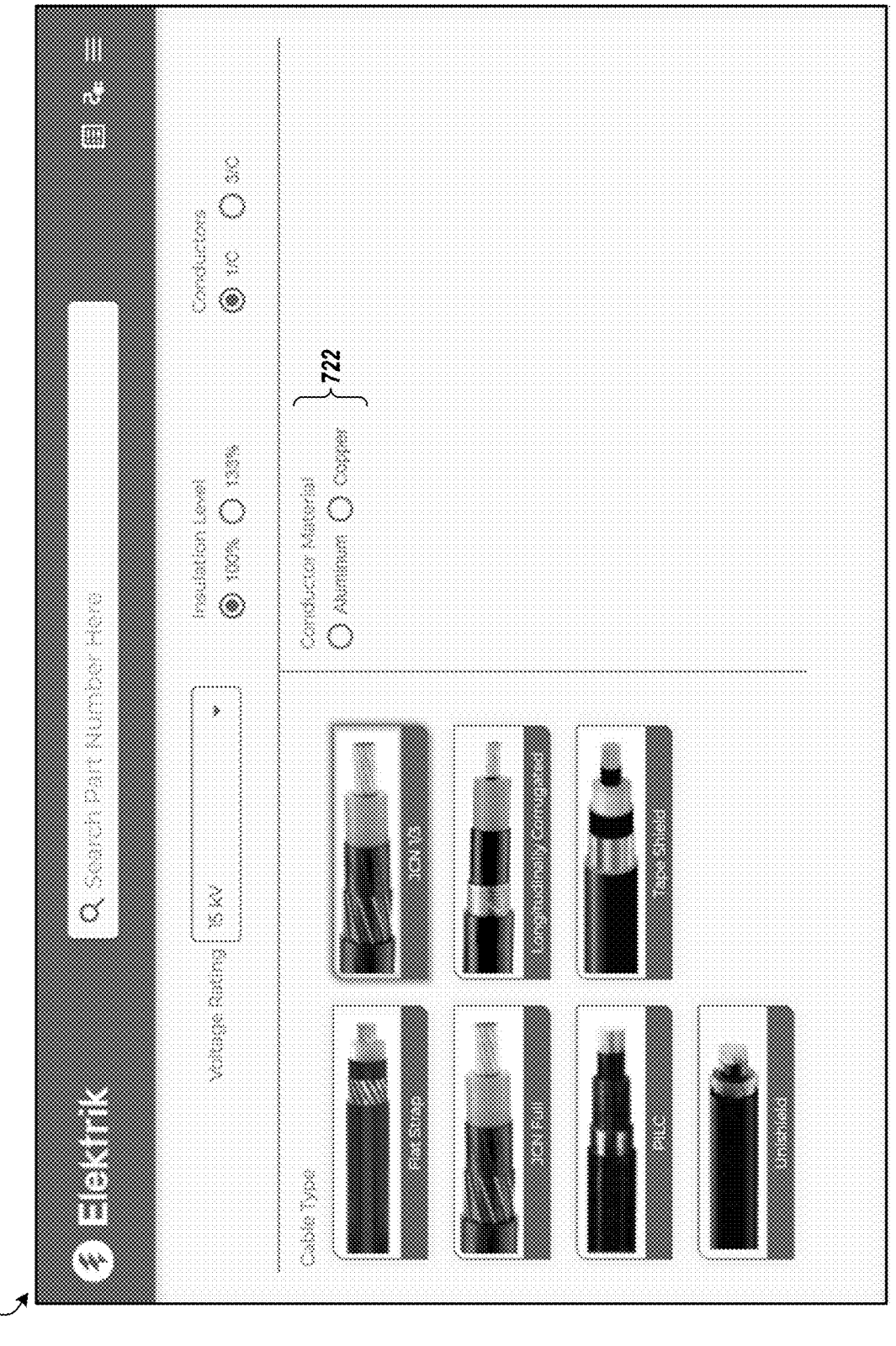
Figure 7F:
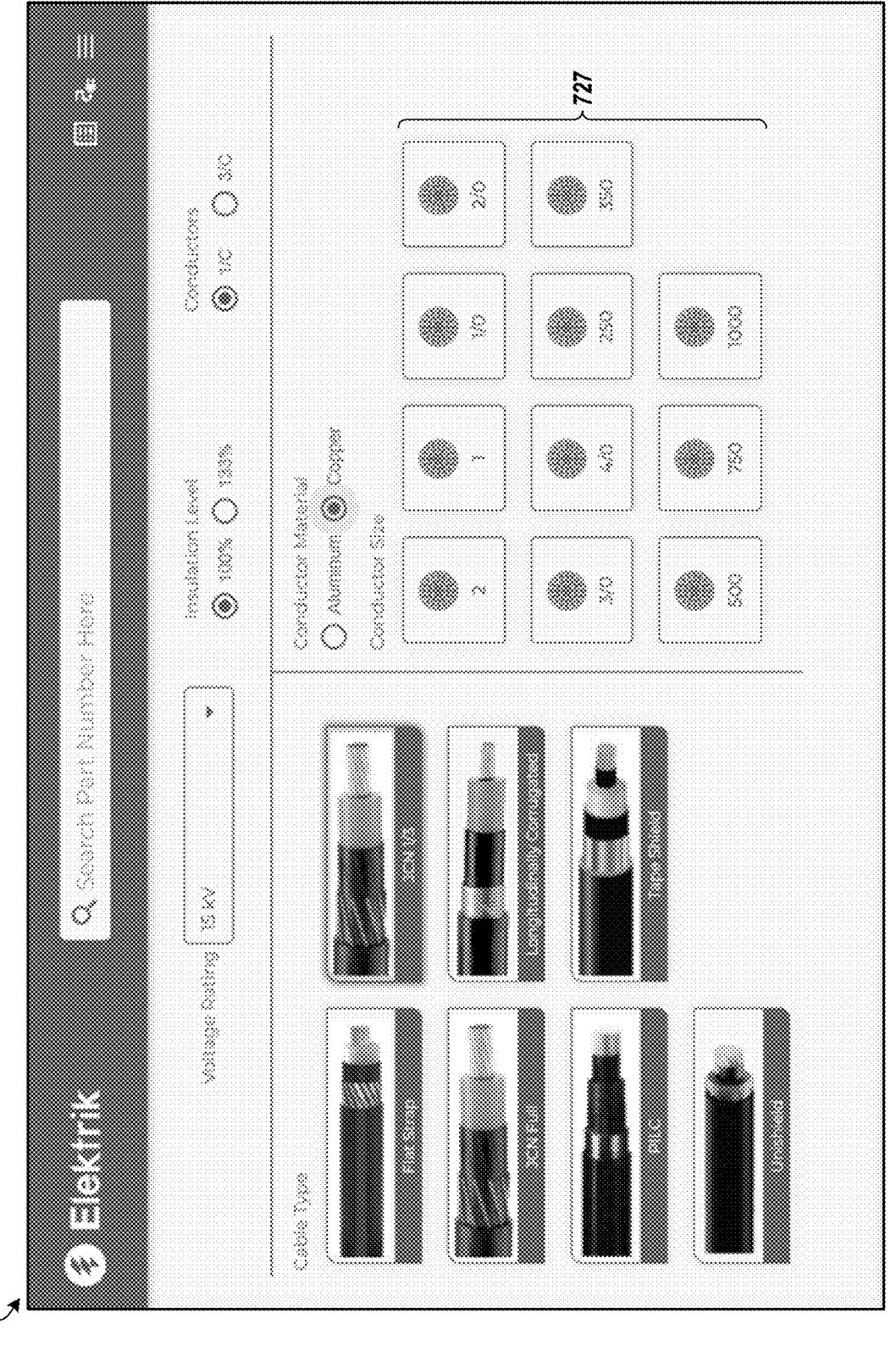

A selected option can be received (428) for a next query parameter (e.g., a third query parameter). Referring to FIG. 7C, for example, the computing device 110 can populate a selection control 712 of interface 710 with the retrieved number of conductors field values, and can receive user input that indicates a selection of one of the number of conductors field values. A number of conductors, for example, can impact a number of accessories that can fit with a cable. In the present example, a user selects 1/C as the number of conductors, and the computing device 110 transmits the selected option for the next query parameter (e.g., the third query parameter) for receipt by the server system.

In the present example, the progressive search can continue by consecutively presenting interfaces 715 (shown in FIG. 7D), 720 (shown in FIG. 7E), and 725 (shown in FIG. 7F), and consecutively receiving user input that indicates a next parameter selection through respective selection controls provided by the interfaces. For example, interface 715 (shown in FIG. 7D) can include a selection control 717 that is populated with cable type field values (e.g., that indicates a purpose of the cable) that result from the execution of a fourth search, and that are presented as query parameter options for a fourth filter level (e.g., a cable type search filter). Interface 720 (shown in FIG. 7E), for example, can include a selection control 722 that is populated with conductor material field values (e.g., that influences a type of connector that is compatible with the cable) that result from the execution of a fifth search, and that are presented as query parameter options for a fifth filter level (e.g., a conductor material search filter). Interface 725 (shown in FIG. 7F), for example, can include a selection control 727 that is populated with conductor size field values that result from the execution of a sixth search, and that are presented as query parameter options for a sixth filter level (e.g., a conductor size search filter).

A determination can again be performed of whether all query parameters have been received for the progressive query (430). In the present example, after receiving a selected query parameter option for the sixth filter level (e.g., the conductor size search filter), the server system 120 can determine that all of the query parameters corresponding to all of the index fields of the compound index (e.g., the voltage field, the insulation field, the number of conductors field, the cable type field, the conductor material field, and the conductor size field) have been received. In response to determining that all query parameters have been received for the progressive query, for example, a search can be performed using the received query parameters and the compound index (432). For example, the server system 120 can execute a final search for electrical cables based on all of the received query parameters. Since the options for each query parameter are the results of executing a query that includes previous query parameters, for example, the final search will return at least one search result.

Figure 7G:
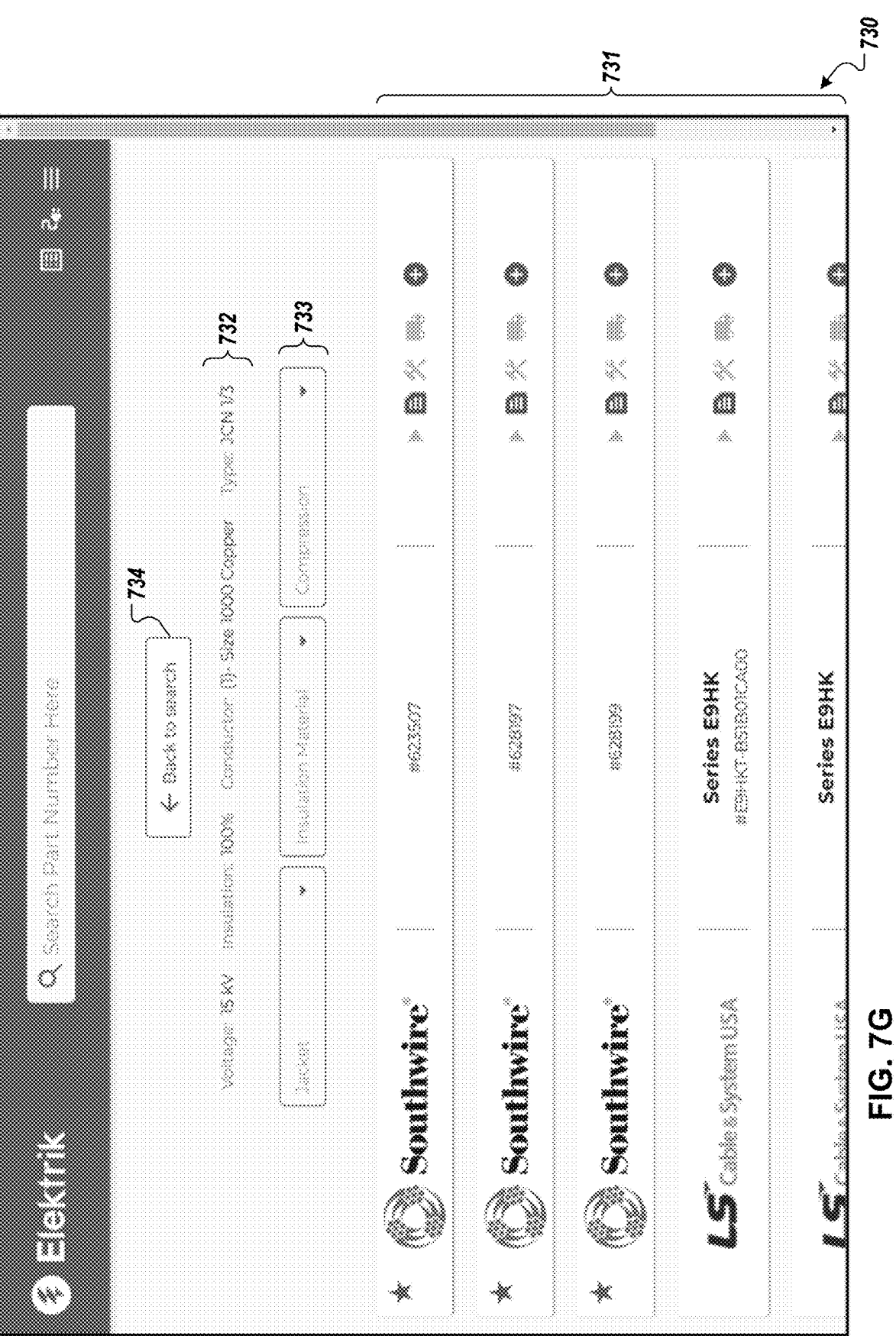

Referring now to FIG. 7G, for example, an interface 730 is shown for presenting results of a progressive search. In general, the progressive search will result in a limited pool of results that reflects the best matches given the search parameters, and not a vast pool of results for a user to consider. In the present example, the interface 730 includes search results 731 (e.g., a list of electrical cables that have attributes that match the received search parameters) and information 732 that indicates the parameters of the progressive search. One or more additional filtering controls 733 (e.g., a jacket filter, an insulation material filter, and a compression filter) can be provided to further filter the search results 731. A back to search control 734 can be provided to return to the search interface described with respect to FIGS. 7A-F.

Figure 7H:
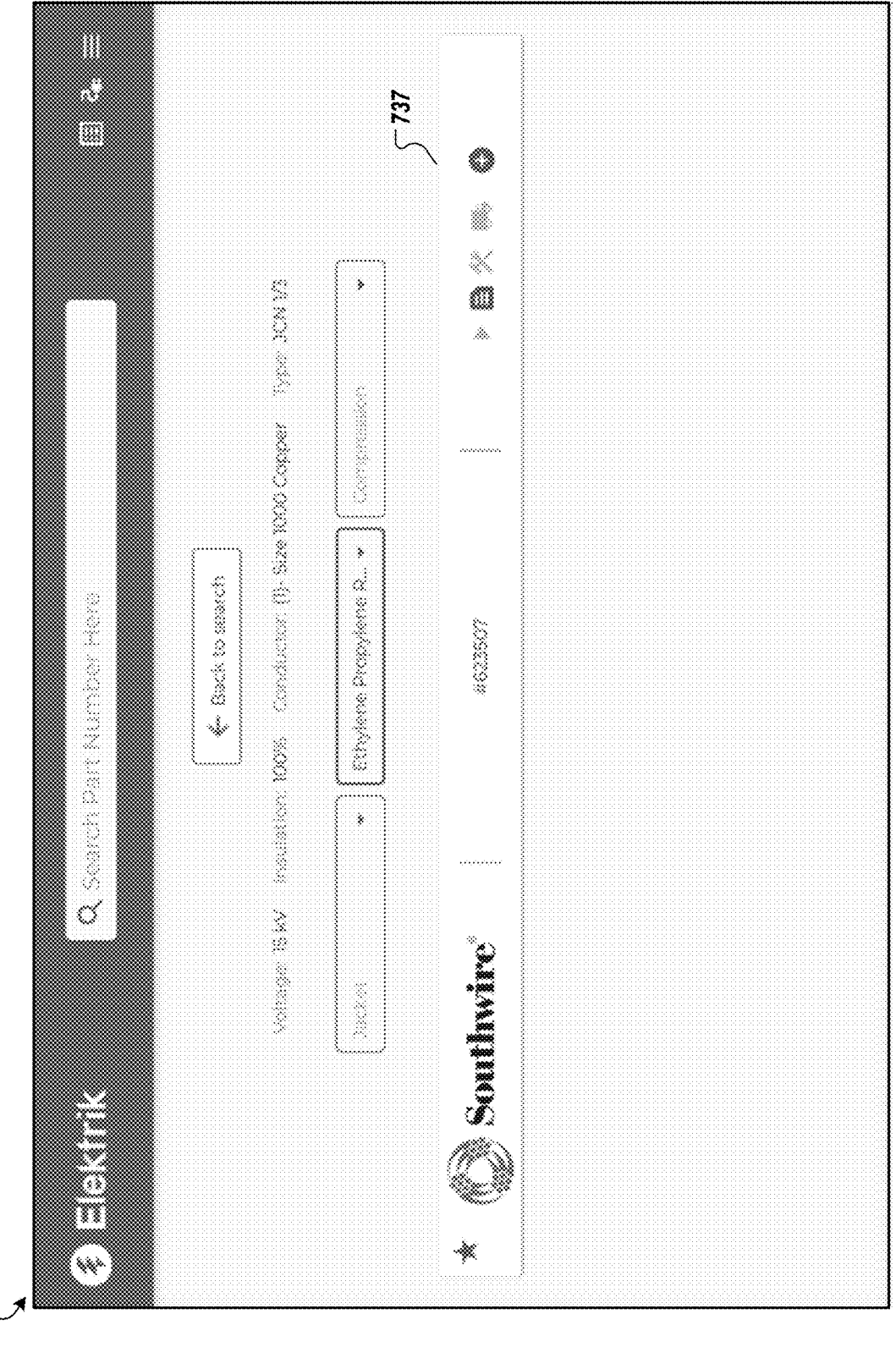

Referring now to FIG. 7H, for example, an interface 735 is shown for presenting results after additional filtering has been applied. In the present example, the user had used the additional filtering control 733 (shown in FIG. 7G) to select ethylene propylene rubber for the insulation material filter, which resulted in a single search result 737 (e.g., electrical cable #623507).

Figure 7I:

Referring now to FIG. 7I, an interface 740 is shown for presenting information related to an electrical cable and matching connection accessories. In response to user selection of an individual search result (e.g., search result 737 for electrical cable #623507, shown in FIG. 7H), for example, the computing device 110 can present the interface 740 that includes information for a part corresponding to the selected search result. As another example, the computing device 110 can present the interface 740 in response to the user searching for a specific part number. In the present example, the interface 740 can present various details 741 related to the electrical cable (e.g., based on product and pricing information 178 retrieved by the server system 120 and provided to the computing device 110). The interface 740 can include an alternative brands control 742, which can be used to generate a query that includes, as query parameters, data values for the electrical cable that correspond to each field in the compound index. In some implementations, the generated query can be represented in a URL that can be shared with other users. In response to selection of the alternative brands control 742, for example, the server system 120 can execute the generated query, and can provide data for rendering the search results (e.g., similar to the interface 730 shown in FIG. 7G). In the present example, the interface 740 includes a list of matching connection accessories 743 (e.g., retrieved from the cache 550 of matching parts data, shown in FIG. 5C). The list of matching connection accessories 743, for example, can be filtered by one or more filtering controls 744 (e.g., a manufacturer filter and a type filter). For each connection accessory in the list of matching connection accessories 743, for example, a corresponding control 745 can be provided for adding the connection accessory to a parts list.

Figure 7J:
FIGS. 7J-K show example user interfaces that facilitate creation of a parts list.

Referring now to FIG. 7J, example user interfaces 750, 755 are shown for facilitating creation of a parts list. User interface 750, for example, can receive as input a project name, a category, and a list name for generating a new parts list. User interface 755, for example, can receive as input a selected project and a selected list to which a part (e.g., an electrical cable or connection accessory) is to be added.

Figure 7K:
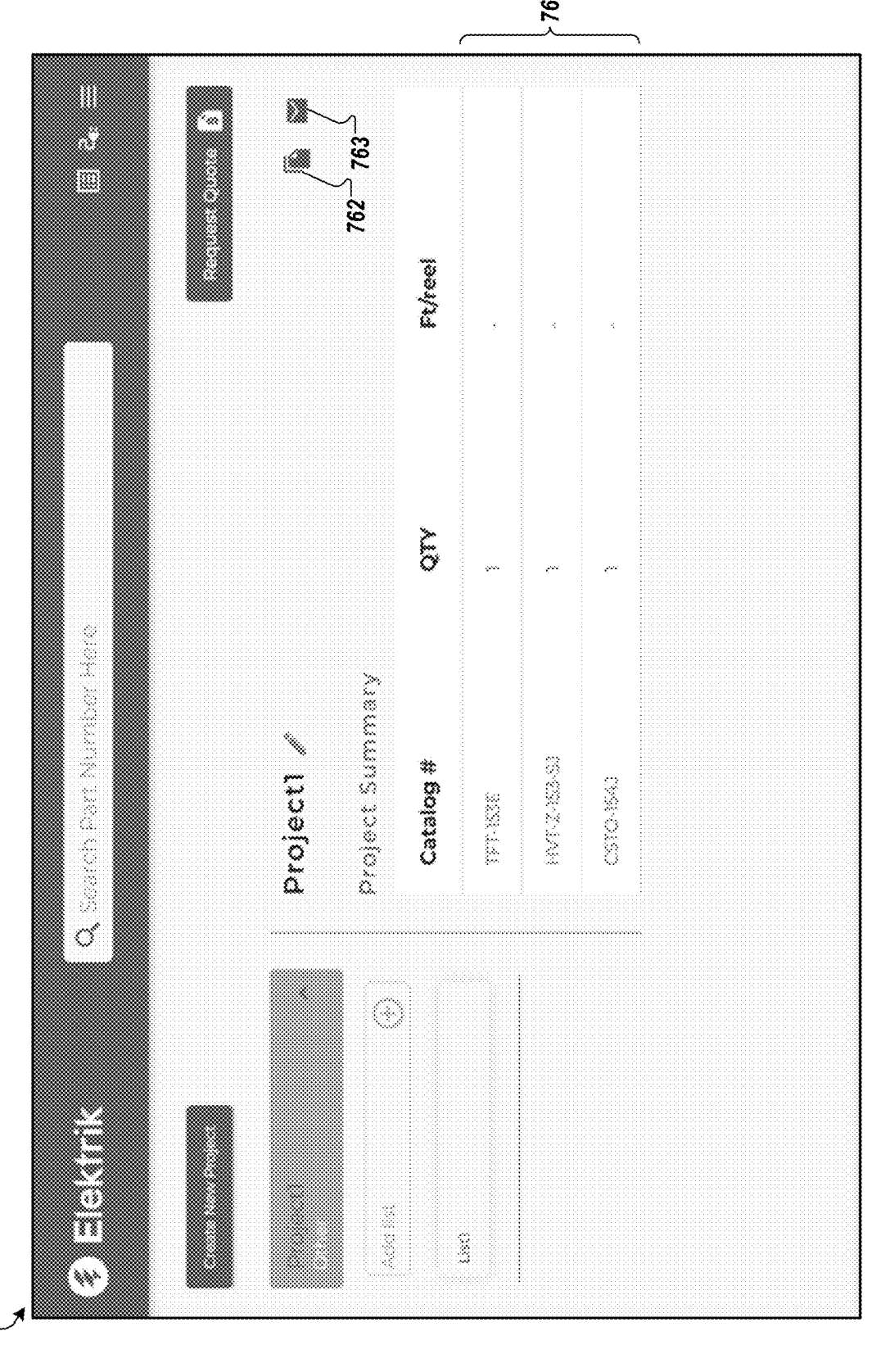

Referring now to FIG. 7K, a user interface 760 is shown for presenting a list of parts 761 (e.g., electrical cables and connection accessories). In some implementations, various operations may be provided with respect to a parts list. In the present example, a control 762 can be provided for aggregating information for parts represented in the list of parts 761. In response to selection of the control 762, for example, the server system 120 can retrieve a data sheet (e.g., a PDF) for each part in the list of parts 761, and can combine the data sheets into an aggregated data sheet. In the present example, a control 763 can be provided for communicating information related to parts represented in the list of parts 761. In response to selection of the control 763, for example, the server system 120 can generate and send an e-mail that includes the list of parts 761 and related information (e.g., data sheets, instruction sheets, videos, links, and other related information).

Figure 8:
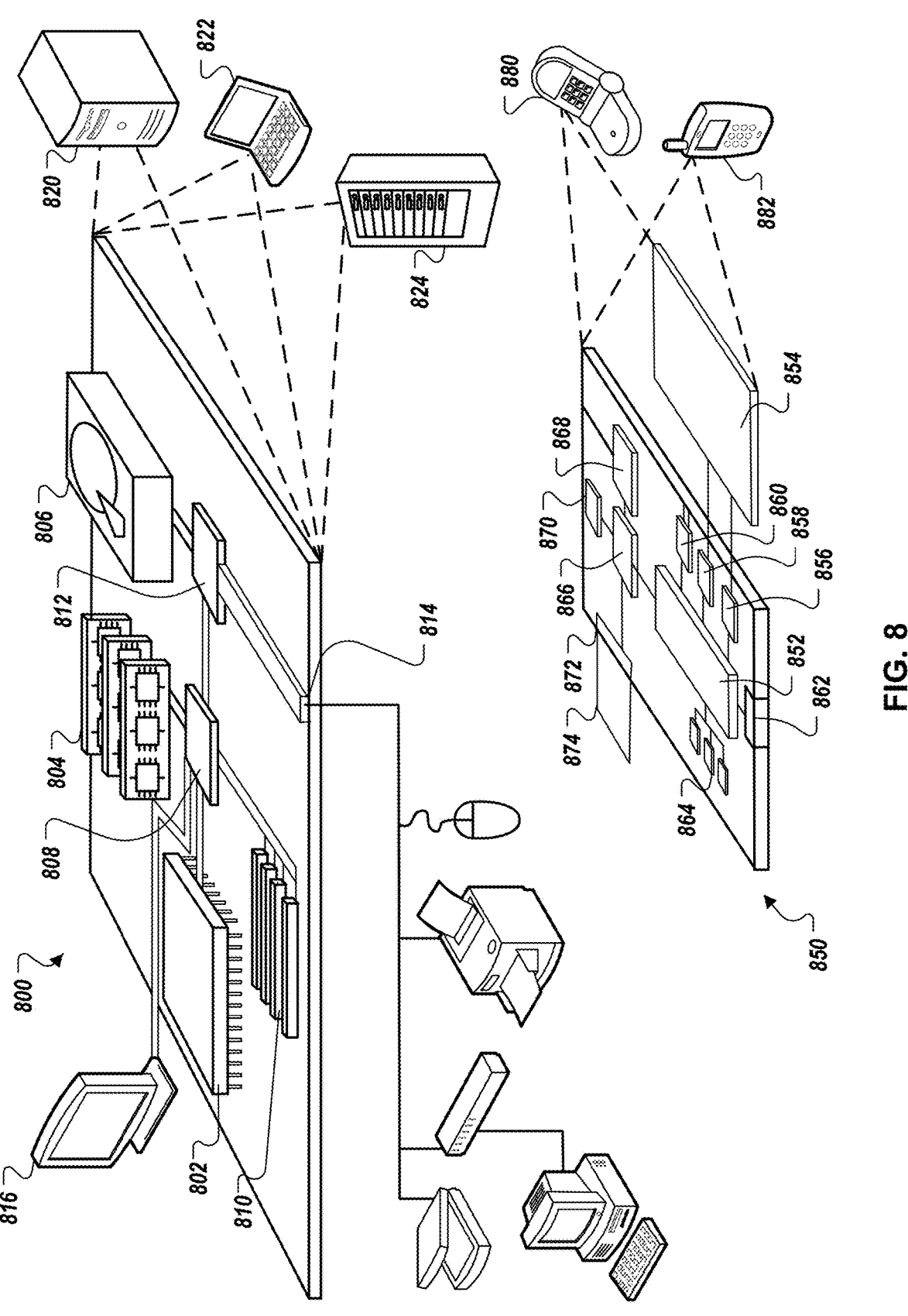
FIG. 8 is a block diagram of example computing devices that may be used to implement the systems and methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally, computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 852 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation—and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer system configured to perform a progressive search of a compound index, the computer system comprising:

a product repository configured as a schemaless database that includes unstructured product data, the unstructured product data comprising, for each product represented in the unstructured product data, a product part number;

at least one association data structure, the association data structure associating, with the product part number, one or more accessory products that are compatible for use with the product; and a computing server configured to perform operations comprising:

generating a compound index based on the unstructured product data and a sequence of parameters;

performing a progressive search, comprising:

receiving, from a computer device over a communication network, a request for information;

identifying a first collection of parts data based on a first index of the compound index and a first parameter of the sequence of parameters;

providing, to the computing device over the communication network, the first collection of parts data;

receiving, from the computing device over the communication network, a first selection based on the first collection of parts data;

identifying a second collection of parts data based on a second parameter of the sequence of parameters, wherein the second collection of parts data is a subset of a second index of the compound index based on the received first selection;

providing, to the computing device over the communication network, the second collection of parts data; and receiving, from the computing device over the communication network, a second selection based on the second collection of parts data;

identifying a collection of accessory data based on the second selection of the progressive search and the association data structure; and providing the identified accessory data to the computing device over the communication network.

2. The computer system of claim 1, wherein the product is an electrical cable, the unstructured product data further comprises an electrical cable part number, a voltage value, an insulation value, a number of conductors value, a cable type value, a conductor metal value, and a conductor size value, and the sequence of parameters includes (i) a voltage parameter corresponding to the voltage value, (ii) an insulation parameter corresponding to the insulation value, (iii) a number of conductors parameter corresponding to the number of conductors value, (iv) a cable type parameter corresponding to the cable type value, (v) a conductor metal parameter corresponding to the conductor metal value, and (vi) a conductor size parameter corresponding to the conductor size value.

3. The computer system of claim 1, wherein the association data structure includes a cache of matching parts data that indicates the one or more accessory products that are compatible for use with the product.

4. The computer system of claim 1, wherein performing a progressive search comprises:

determining and transmitting one or more query parameter options for a first filter level;

receiving a selected option for a first query parameter;

iteratively determining and transmitting query parameter options for subsequent filter levels, and receiving selected options for subsequent query parameters until selected options for all of the query parameters are received; and performing a search using the first query parameter and the subsequent query parameters to identify the collection of accessory product information.

5. The computer system of claim 1, wherein the requested information includes the one or more accessory products that are compatible for use with the product.

6. The computer system of claim 1, the operations further comprising:

extracting unstructured product data for each product from a datasheet; and ingesting the unstructured product data into the schemaless database.

7. A computer-implemented method of performing a progressive search of a compound index, the method, comprising:

receiving requests for information from computing devices;

accessing a product repository configured as a schemaless database that comprises unstructured product data and an association data structure to identify the requested information, wherein the product repository includes product data;

generating a compound index based on the unstructured product data and a sequence of parameters;

performing a progressive search, comprising:

receiving, from a computing device over a communication network, a request for information;

identifying a first collection of parts data based on a first index of the compound index and a first parameter of the sequence of parameters;

providing, to the computing device over the communication network, the first collection of parts data;

receiving, from the computing device over the communication network, a first selection based on the first collection of parts data;

identifying a second collection of parts data based on a second parameter of the sequence of parameters, wherein the second collection of parts data is a subset of a second index of the compound index based on the received first selection;

providing, to the computing device over the communication network, the second collection of parts data; and receiving, from the computing device over the communication network, a second selection based on the second collection of parts data;

identifying a collection of accessory product data based on the second selection of the progressive search and the association data structure; and providing the identified accessory product data to the computing device over the communication network.

8. The computer-implemented method of claim 7, wherein the product is an electrical cable, the unstructured product data further comprises an electrical cable part number, a voltage value, an insulation value, a number of conductors value, a cable type value, a conductor metal value, and a conductor size value, and the sequence of parameters includes (i) a voltage parameter corresponding to the voltage value, (ii) an insulation parameter corresponding to the insulation value, (iii) a number of conductors parameter corresponding to the number of conductors value, (iv) a cable type parameter corresponding to the cable type value, (v) a conductor metal parameter corresponding to the conductor metal value, and (vi) a conductor size parameter corresponding to the conductor size value.

9. The computer-implemented method of claim 7, wherein the association data structure includes a cache of matching parts data that indicates the one or accessory products that are compatible for use with the product.

10. The computer-implemented method of claim 7, wherein performing a progressive search comprises:

determining and transmitting one or more query parameter options for a first filter level;

receiving a selected option for a first query parameter;

iteratively determining and transmitting query parameter options for subsequent filter levels, and receiving selected options for subsequent query parameters until selected options for all of the query parameters are received; and performing a search using the first query parameter and the subsequent query parameters to identify the collection of accessory product information.

11. The computer-implemented method of claim 7, wherein the collection of accessory product information includes the one or more accessory products that are compatible for use with the product.

12. The computer-implemented method of claim 7, further comprising:

extracting unstructured product data for each product from a datasheet; and ingesting the unstructured product data into the schemaless database.

13. A non-transitory, computer-readable medium storing one or more instructions configured to perform a progressive search of a compound index and executable by a computer system to perform operations comprising:

generating a compound index based on unstructured product data and a sequence of parameters;

performing a progressive search, comprising:

receiving, from a computing device over a communication network, a request for information;

identifying a first collection of parts data based on a first index of the compound index and a first parameter of the sequence of parameters;

providing, to the computing device over the communication network, the first collection of parts data;

receiving, from the computing device over the communication network, a first selection based on the first collection of parts data;

identifying a second collection of parts data based on a second parameter of the sequence of parameters, wherein the second collection of parts data is a subset of a second index of the compound index based on the received first selection;

providing, to the computing device over the communication network, the second collection of parts data; and receiving, from the computing device over the communication network, a second selection based on the second collection of parts data;

identifying a collection of connection accessory data based on the second selection of the progressive search and an association data structure, wherein the association data structure associates, with the product, one or more accessory products that are compatible for use with the product; and providing the identified connection accessory data to the computing device over the communication network.

14. The computer-readable medium of claim 13, wherein the product is an electrical cable, the unstructured product data further comprises an electrical cable part number, a voltage value, an insulation value, a number of conductors value, a cable type value, a conductor metal value, and a conductor size value, and the sequence of parameters includes (i) a voltage parameter corresponding to the voltage value, (ii) an insulation parameter corresponding to the insulation value, (iii) a number of conductors parameter corresponding to the number of conductors value, (iv) a cable type parameter corresponding to the cable type value, (v) a conductor metal parameter corresponding to the conductor metal value, and (vi) a conductor size parameter corresponding to the conductor size value.

15. The computer-readable medium of claim 13, wherein the association data structure includes a cache of matching parts data that indicates the one or more accessory products that are compatible for use with the product.

16. The computer-readable medium of claim 13, wherein performing a progressive search comprises:

determining and transmitting one or more query parameter options for a first filter level;

receiving a selected option for a first query parameter;

iteratively determining and transmitting query parameter options for subsequent filter levels, and receiving selected options for subsequent query parameters until selected options for all of the query parameters are received; and performing a search using the first query parameter and the subsequent query parameters to identify the collection of accessory product information.

17. The computer-readable medium of claim 13, the operations further comprising:

extracting unstructured product data for each product from a datasheet; and ingesting the unstructured product data into a product repository and an association data structure to identify the requested information, wherein the product repository configured as a schemaless database that comprises product data, the unstructured product data comprising, for each product represented in the unstructured product data, a product part number.

\* \* \* \* \*